(12) United States Patent
Nagai et al.

(10) Patent No.: US 11,328,866 B2
(45) Date of Patent: *May 10, 2022

(54) ELECTRONIC COMPONENT

(71) Applicant: TDK CORPORATION, Tokyo (JP)

(72) Inventors: Yuichi Nagai, Tokyo (JP); Atsushi Takeda, Tokyo (JP); Takehisa Tamura, Tokyo (JP); Shinya Onodera, Tokyo (JP)

(73) Assignee: TDK CORPORATION, Tokyo (JP)

(*) Notice: Subject to any disclaimer, the term of this patent is extended or adjusted under 35 U.S.C. 154(b) by 136 days.

This patent is subject to a terminal disclaimer.

(21) Appl. No.: 16/819,761

(22) Filed: Mar. 16, 2020

(65) Prior Publication Data

US 2020/0312550 A1    Oct. 1, 2020

(30) Foreign Application Priority Data

Mar. 25, 2019    (JP) .............................. JP2019-056108

(51) Int. Cl.
*H01G 4/005* (2006.01)
*H01G 4/33* (2006.01)

(52) U.S. Cl.
CPC ............... *H01G 4/005* (2013.01); *H01G 4/33* (2013.01)

(58) Field of Classification Search
CPC ........ H01G 4/005; H01G 4/232; H01G 4/248; H01G 4/30; H01G 4/33
See application file for complete search history.

(56) References Cited

U.S. PATENT DOCUMENTS

| | | | |
|---|---|---|---|
| 9,087,644 B2* | 7/2015 | Jeon | H01G 4/30 |
| 11,056,284 B2* | 7/2021 | Kim | H01G 4/012 |
| 2013/0242457 A1* | 9/2013 | Lee | H01G 4/2325 |
| | | | 361/301.4 |
| 2014/0085770 A1* | 3/2014 | Park | H01G 4/232 |
| | | | 361/305 |
| 2017/0186538 A1* | 6/2017 | Ando | H01G 4/30 |
| 2017/0186549 A1 | 6/2017 | Kurokawa et al. | |
| 2017/0301468 A1* | 10/2017 | Kim | H01G 4/232 |
| 2017/0345553 A1 | 11/2017 | Shimoyasu et al. | |

(Continued)

FOREIGN PATENT DOCUMENTS

| | | |
|---|---|---|
| JP | 2017-120819 A | 7/2017 |
| JP | 2018-157029 A | 10/2018 |
| KR | 10-2017-0135726 A | 12/2017 |

*Primary Examiner* — Nathan Milakovich
(74) *Attorney, Agent, or Firm* — Oliff PLC

(57) ABSTRACT

An electronic component includes an element body and an external electrode. The element body includes a principal surface arranged to constitute a mounting surface and an end surface adjacent to the principal surface. The external electrode includes a conductive resin layer disposed to continuously cover a part of the principal surface and a part of the end surface, and a plating layer covering the conductive resin layer. The conductive resin layer includes a first region positioned on the end surface, a second region positioned on a ridge portion between the end surface and the principal surface, and a third region positioned on the principal surface. In a case where a maximum thickness of the first region is T1 (μm) and a minimum thickness of the second region is T2 (μm), the maximum thickness T1 and the minimum thickness T2 satisfy a relation of $T2/T1 \geq 0.26$.

17 Claims, 11 Drawing Sheets

(56) References Cited

U.S. PATENT DOCUMENTS

| | | | |
|---|---|---|---|
| 2018/0151296 A1* | 5/2018 | Yamada | H01G 4/30 |
| 2018/0268998 A1 | 9/2018 | Onodera et al. | |
| 2019/0237261 A1* | 8/2019 | Onodera | H01G 4/30 |
| 2019/0341191 A1* | 11/2019 | Onodera | H01G 2/06 |
| 2020/0185144 A1 | 6/2020 | Shimoyasu et al. | |
| 2020/0312551 A1* | 10/2020 | Nagai | H01G 4/30 |
| 2020/0312563 A1* | 10/2020 | Nagai | H01G 4/232 |

* cited by examiner

Fig.10

| SAMPLE | 1 | 2 | 3 | 4 | 5 | 6 | 7 | 8 | 9 | 10 | 11 |
|---|---|---|---|---|---|---|---|---|---|---|---|
| T1 (μm) | 58 | 80 | 82 | 87 | 79 | 79 | 82 | 80 | 79 | 82 | 82 |
| T2 (μm) | 12 | 20 | 21 | 25 | 29 | 29 | 30 | 32 | 29 | 62 | 75 |
| T3 (μm) | 13 | 40 | 49 | 54 | 39 | 42 | 49 | 86 | 119 | 124 | 154 |
| T2/T1 | 0.21 | 0.25 | 0.26 | 0.29 | 0.37 | 0.37 | 0.37 | 0.40 | 0.37 | 0.76 | 0.91 |
| T3/T1 | 0.22 | 0.50 | 0.60 | 0.62 | 0.49 | 0.53 | 0.60 | 1.08 | 1.51 | 1.51 | 1.88 |
| INCIDENCE RATIO OF PEEL-OFF | 100% | 50% | 0% | 0% | 0% | 0% | 0% | 0% | 0% | 4% | 5% |

ELECTRONIC COMPONENT

BACKGROUND OF THE INVENTION

1. Field of the Invention

The present invention relates to an electronic component.

2. Description of Related Art

Known electronic components include an element body and an external electrode disposed on the element body (for example, refer to Japanese Unexamined Patent Publication No. 2018-157029). The element body includes a principal surface arranged to constitute a mounting surface and an end surface adjacent to the principal surface. The external electrode includes a conductive resin layer disposed to continuously cover a part of the principal surface and a part of the end surface, and a plating layer covering the conductive resin layer.

SUMMARY OF THE INVENTION

The conductive resin layer generally contains a resin and conductive particles. The resin tends to absorb moisture. In a case in which the electronic component is solder-mounted on an electronic device, the moisture absorbed by the resin may be gasified so that volume expansion may occur. In this case, stress may act on the conductive resin layer, and the conductive resin layer may be cracked and be peeled off. The conductive particles include, for example, metal. The electronic device includes, for example, a circuit board or an electronic component.

An object of an aspect of the present invention is to provide an electronic component that controls peel-off of a conductive resin layer.

An electronic component according to an aspect of the present invention includes an element body and an external electrode disposed on the element body. The element body includes a principal surface arranged to constitute a mounting surface, and an end surface adjacent to the principal surface. The external electrode includes a conductive resin layer disposed to continuously cover a part of the principal surface and a part of the end surface, and a plating layer covering the conductive resin layer. The conductive resin layer includes a first region positioned on the end surface, a second region positioned on a ridge portion between the end surface and the principal surface, and a third region positioned on the principal surface. In a case where a maximum thickness of the first region is T1 ($\mu$m) and a minimum thickness of the second region is T2 ($\mu$m), the maximum thickness T1 and the minimum thickness T2 satisfy a relation of $$T2/T1 \geq 0.26.$$

As a result of research and study by the present inventors, the present inventors have discovered the following matters.

The plating layer covering the conductive resin layer tends to be in cohesive contact with the conductive resin layer, but tends not to be in cohesive contact with the element body. Therefore, a gap is formed between an end edge of the plating layer and the element body. In a case where the moisture absorbed by the resin is gasified, the gas generated from the moisture reaches the gap between the end edge of the plating layer and the element body, and the gas is emitted outside the external electrode through the gap. Since the gas generated from the moisture is emitted outside the external electrode, stress tends not to act on the conductive resin layer. Hereinafter, the gap between the end edge of the plating layer and the element body is referred to as a "gap" simply.

The inventors conducted further research and study on a configuration in which the gas generated from the moisture reaches the gap reliably.

The third region of the conductive resin layer is close to the gap, and thus the gas generated from the moisture absorbed by the resin of the third region tends to reach the gap. Since the second region is positioned between the first region and the third region, the first region is away from the gap. Therefore, the gas generated from the moisture absorbed by the resin of the first region tends not to reach the gap. In order to emit, outside the external electrode, the gas generated from the moisture absorbed by the resin of the first region, it is desired to achieve a configuration in which the gas generated from the moisture absorbed by the resin of the first region reaches the gap reliably. In a case in which the gas generated from the moisture absorbed by the resin of the first region reaches the gap reliably, the gas generated from the moisture absorbed by the resin of the third region also reaches the gap reliably.

The inventors focused on a path through which the gas generated from the moisture absorbed by the resin of the first region reaches the gap. The gas generated from the moisture absorbed by the resin of the first region passes through the second region to reach the third region. Therefore, in a case in which the gas tends to move in the second region, the gas tends to flow from the first region to the third region. Consequently, the inventors found out that the gas generated from the moisture absorbed by the resin of the first region reaches the gap reliably in a case where a desired relation holds between a thickness of the first region and a thickness of the second region. Specifically, in a case where the maximum thickness T1 of the first region and the minimum thickness T2 of the second region satisfy the relation of $$T2/T1 \geq 0.26,$$

the gas generated from the moisture absorbed by the resin of the first region passes through the second region to reach the third region reliably.

Therefore, in the above-described aspect, the gas generated from the moisture absorbed by the resin of the conductive resin layer (the first region) passes through the second region and the third region, and reaches the gap reliably. The gas that has reached the gap is emitted outside the external electrode, so that the stress tends not to act on the conductive resin layer. Consequently, the above-described aspect controls the peel-off of the conductive resin layer.

In the above-described aspect, the maximum thickness T1 and the minimum thickness T2 may satisfy a relation of $$T2/T1 \leq 0.91.$$

As a result of research and study by the present inventors, the present inventors also have discovered the following matters.

The gap is an outlet of the gas generated from the moisture absorbed by the resin of the conductive resin layer, and is also an inlet of moisture to the external electrode. The path through which the gas generated from the moisture absorbed by the resin of the first region reaches the gap may serve as a path through which the moisture reaches the first region. The moisture that has reached the first region is absorbed in the first region. In this case, the gas generation amount may increase. Therefore, in order to reduce the absorption of the moisture in the first region, it is desired to achieve a configuration in which the moisture tends not to reach the first region.

The inventors found out that the moisture tends not to reach the first region in a case where a desired relation holds between the thickness of the first region and the thickness of the second region. Specifically, in a configuration where the maximum thickness T1 and the minimum thickness T2 satisfy the relation of $$T2/T1 \leq 0.91,$$

the moisture tends not to reach the first region even in a case in which the moisture enters from the gap. Therefore, this configuration reduces an increase in moisture absorbed in the conductive resin layer (the first region) and an increase in gas generated from the moisture. Consequently, this configuration further controls the peel-off of the conductive resin layer.

In the above-described aspect, in a case where a maximum thickness of the third region is T3 (μm), the maximum thickness T1 and the maximum thickness T3 may satisfy a relation of $$T3/T1 \geq 0.49.$$

As a result of research and study by the present inventors, the present inventors also have discovered the following matters.

In order to make the gas generated from the moisture absorbed by the resin of the first region reach the gap more reliably, it is desired to achieve a configuration in which the gas further tends to move in the third region.

The inventors found out that the gas further tends to move in the third region in a case where a desired relation holds between the thickness of the first region and the thickness of the third region. Specifically, the gas further tends to move in the third region in a case where the maximum thickness T1 of the first region and the maximum thickness T3 of the third region satisfy the relation of $$T3/T1 \geq 0.49.$$

Therefore, in this configuration, the gas generated from the moisture absorbed by the resin of the conductive resin layer (the first region) reaches the gap more reliably. The stress further tends not to act on the conductive resin layer. Consequently, this configuration further controls the peel-off of the conductive resin layer.

In the above-described aspect, the maximum thickness T1 and the maximum thickness T3 may satisfy a relation of $$T3/T1 \geq 1.88.$$

As a result of research and study by the present inventors, the present inventors also have discovered the following matters.

As described above, the path through which the gas generated from the moisture absorbed by the resin of the first region reaches the gap may serve as a path through which the moisture reaches the first region. Specifically, the third region is positioned on the path through which the moisture passes. Therefore, in order to reduce the absorption of the moisture in the first region, it is desired to achieve a configuration in which the moisture tends not to reach the first region through the third region.

The inventors found out that the moisture tends not to reach the first region in a case where a desired relation holds between the thickness of the first region and the thickness of the third region. Specifically, in a configuration where the maximum thickness T1 and the thickness T3 satisfy the relation of $$T3/T1 \leq 1.88,$$

the moisture tends not to reach the first region through the third region even in a case in which the moisture enters from the gap. Therefore, this configuration reduces an increase in moisture absorbed in the conductive resin layer (the first region) and an increase in gas generated from the moisture. Consequently, this configuration further controls the peel-off of the conductive resin layer.

In the above-described aspect, the maximum thickness T3 of the third region may be larger than the minimum thickness T2.

The inventors found out that the gas further tends to move in the third region in a case where a desired relation holds between the thickness of the second region and the thickness of the third region. Specifically, the gas further tends to move in the third region in a case where the maximum thickness of the third region is larger than the minimum thickness T2. Therefore, in this configuration, the gas generated from the moisture absorbed by the resin of the conductive resin layer (the first region) reaches the gap more reliably. The stress further tends not to act on the conductive resin layer. Consequently, this configuration further controls the peel-off of the conductive resin layer.

In the above-described aspect, in a cross-section orthogonal to the principal surface and the end surface, a surface of the third region may curve in a convex shape in a direction away from the principal surface.

In this configuration, since the thickness of the third region tends not to be small locally, a movement path of the gas in the third region tends not to be narrow on the movement path. Therefore, this configuration tends not to suppress the movement of the gas in the third region. The gas generated from the moisture absorbed by the resin of the conductive resin layer reaches the gap more reliably. Consequently, this configuration controls the peel-off of the conductive resin layer more reliably.

In the above-described aspect, the external electrode may further include a sintered metal layer that is disposed over the principal surface and the end surface and is covered with the conductive resin layer. With a plane including the end surface as a reference plane, a length from an end edge of the sintered metal layer to an end edge of the third region in a direction orthogonal to the end surface may be larger than a length from the reference plane to the end edge of the sintered metal layer in the direction orthogonal to the end surface.

As a result of research and study by the present inventors, the present inventors also have discovered the following matters.

The degree of cohesive contact between the element body and the conductive resin layer is lower than the degree of cohesive contact between the sintered metal layer and the conductive resin layer. Therefore, an interface between the sintered metal layer and the conductive resin layer tends not to contribute to the movement path of the gas, and an interface between the element body and the conductive resin layer tends to contribute as the movement path of the gas.

The inventors focused on a length of the interface between the sintered metal layer and the conductive resin layer, and a length of the interface between the element body and the conductive resin layer. Consequently, the inventors found out that the movement path of the gas increases in a case where a desired relation holds between the length from the reference plane to the end edge of the sintered metal layer in the direction orthogonal to the end surface and the length from the end edge of the sintered metal layer to the end edge of the third region in the direction orthogonal to the end surface. The movement path of the gas increases in a case where the length from the end edge of the sintered metal layer to the end edge of the third region in the direction orthogonal to the end surface is larger than the length from the reference plane to the end edge of the sintered metal layer in the direction orthogonal to the end surface. Therefore, in this configuration, the gas generated from the moisture absorbed by the resin of the conductive resin layer tends to move toward the gap. The stress tends not to act on the conductive resin layer. Consequently, this configuration further controls the peel-off of the conductive resin layer.

In the above-described aspect, when viewed from a direction orthogonal to the principal surface, an end edge of the third region may curve.

In this configuration, the length of the end edge of the third region is larger than that of a configuration in which the end edge of the third region has a linear shape. Therefore, in this configuration, a region from which the gas is emitted is large, and the gas further tends to be emitted from the external electrode. Consequently, the stress further tends not to act on the conductive resin layer.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 10 is a table illustrating an incidence ratio of peel-off of the second electrode layer in each of samples;

DETAILED DESCRIPTION OF EMBODIMENTS

Figure 1:
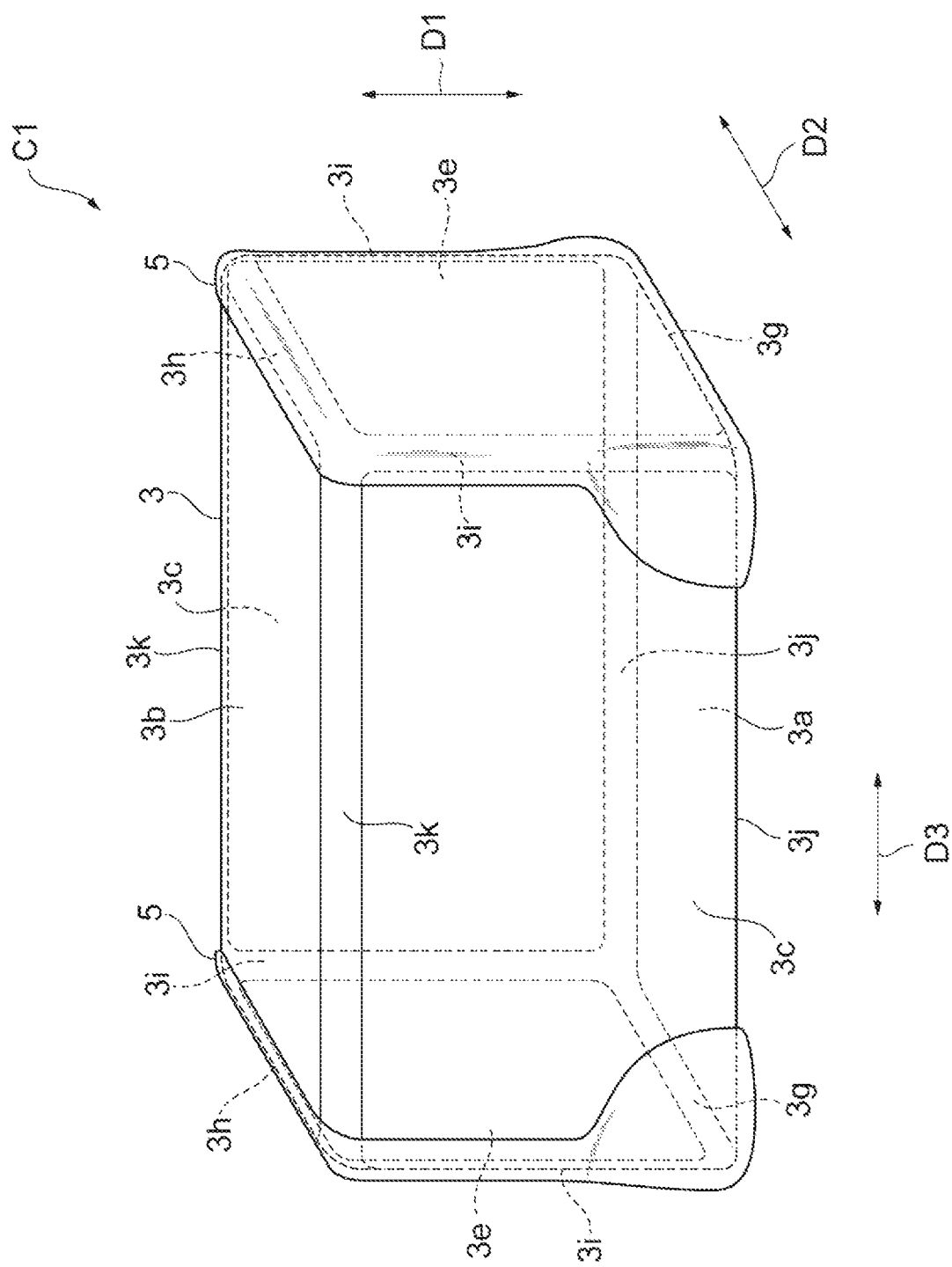
FIG. 1 is a perspective view of a multilayer capacitor according to an embodiment.

Hereinafter, embodiments of the present invention will be described in detail with reference to the accompanying drawings. In the following description, the same elements or elements having the same functions are denoted with the same reference numerals and overlapped explanation is omitted.

Figure 2:
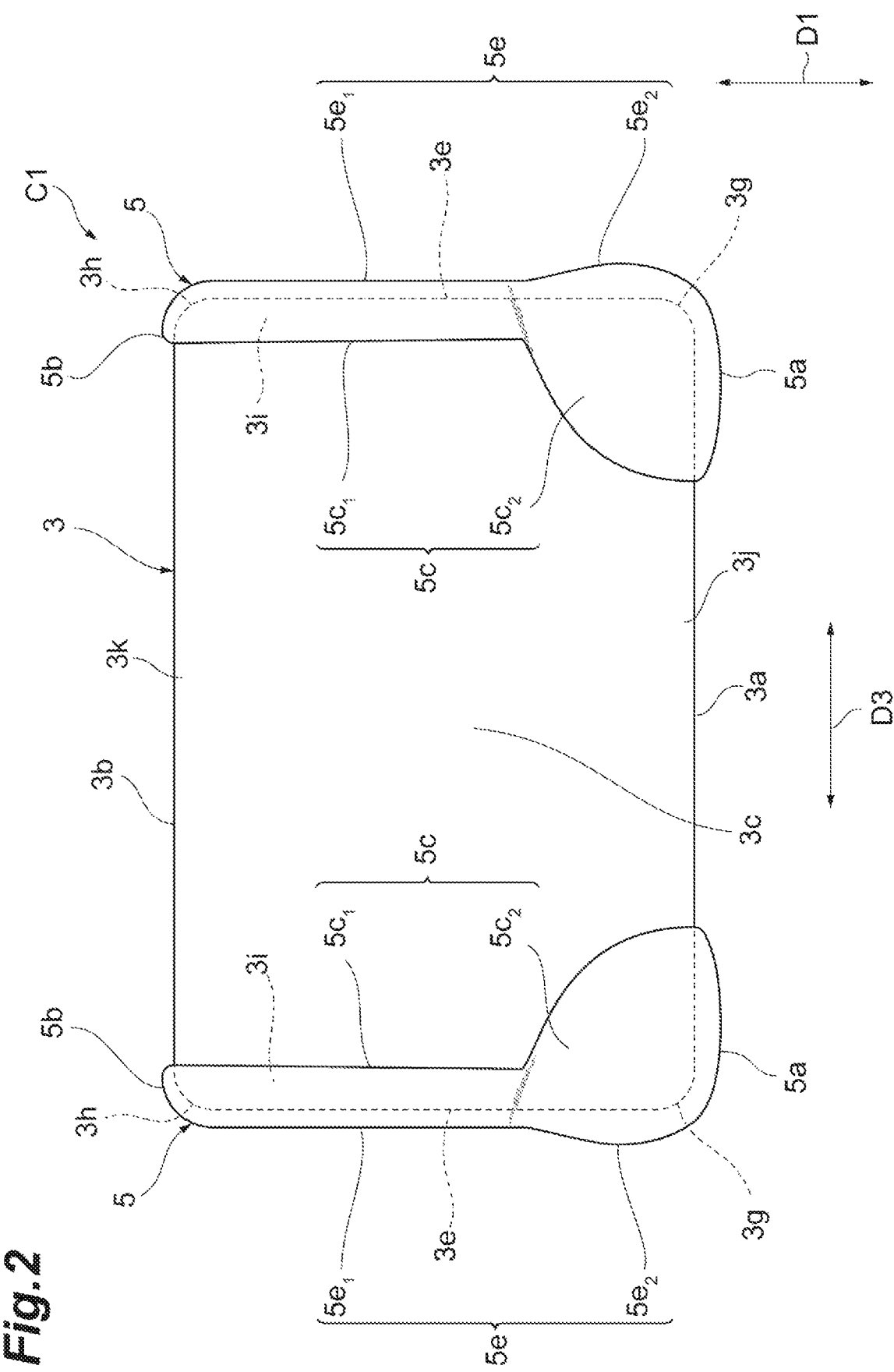
FIG. 2 is a side view of the multilayer capacitor according to the embodiment.
Figure 3:
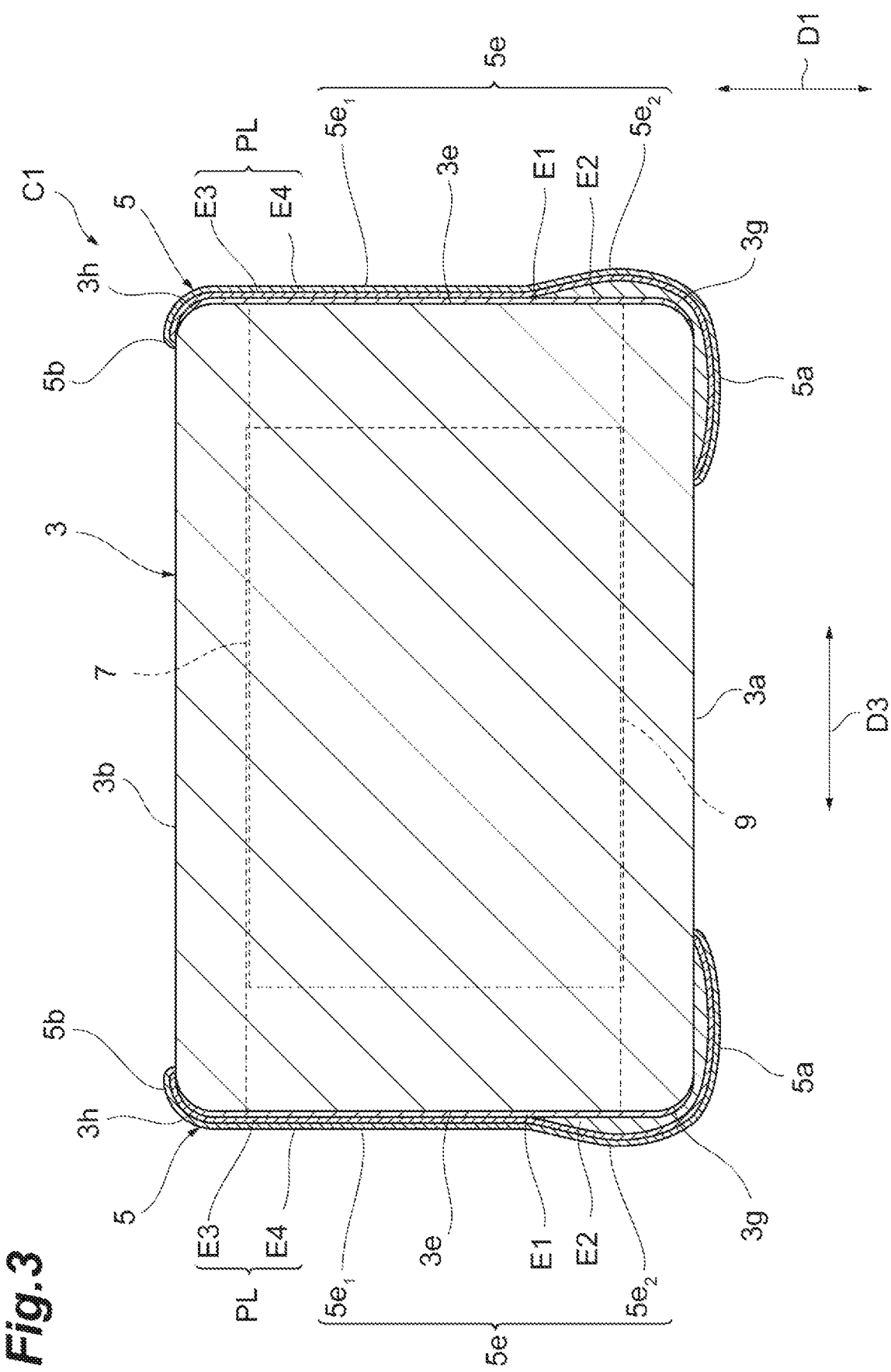
FIG. 3 is a view illustrating a cross-sectional configuration of the multilayer capacitor according to the embodiment.
Figure 4:
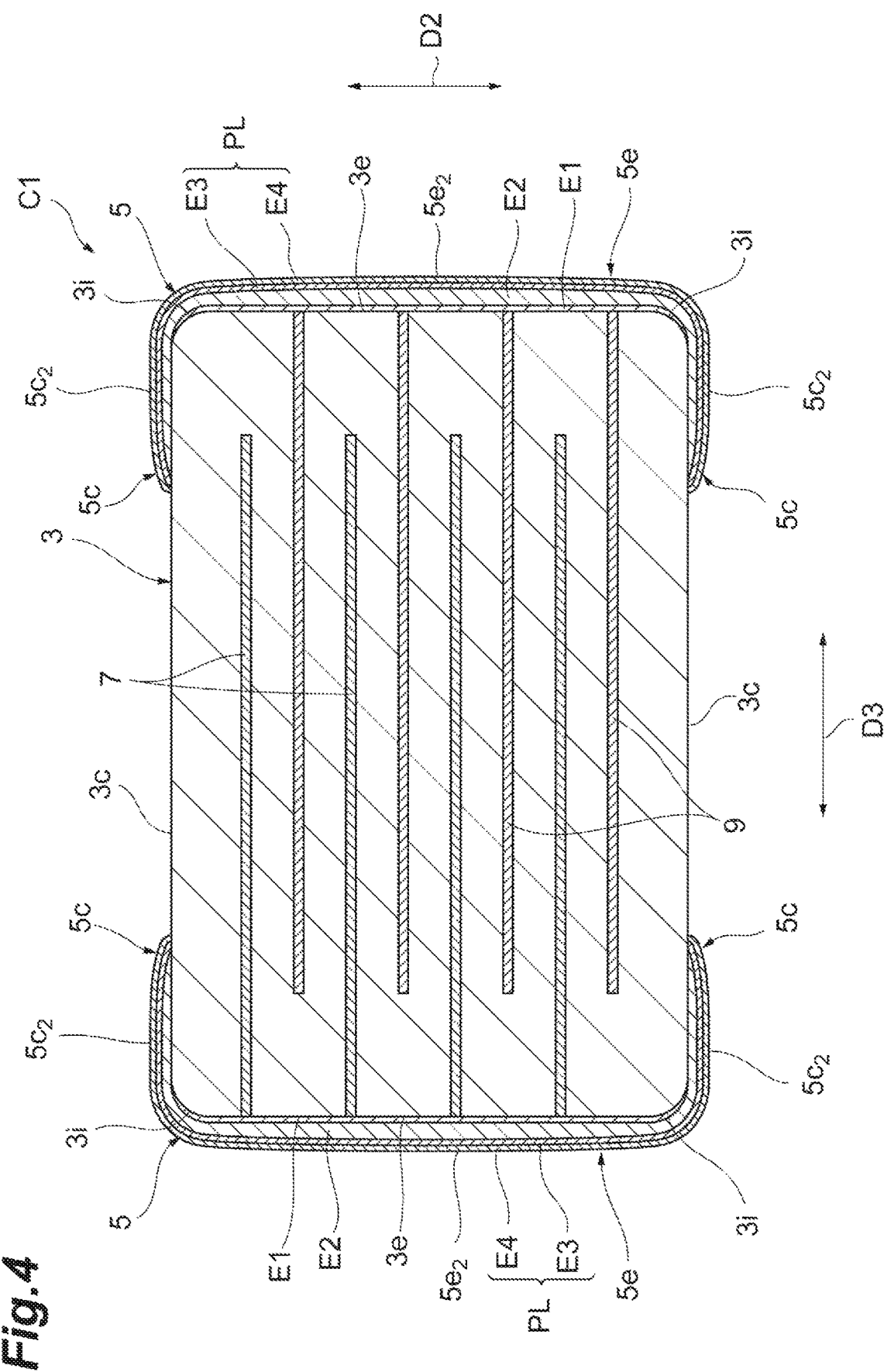
FIG. 4 is a view illustrating a cross-sectional configuration of the multilayer capacitor according to the embodiment.
Figure 5:
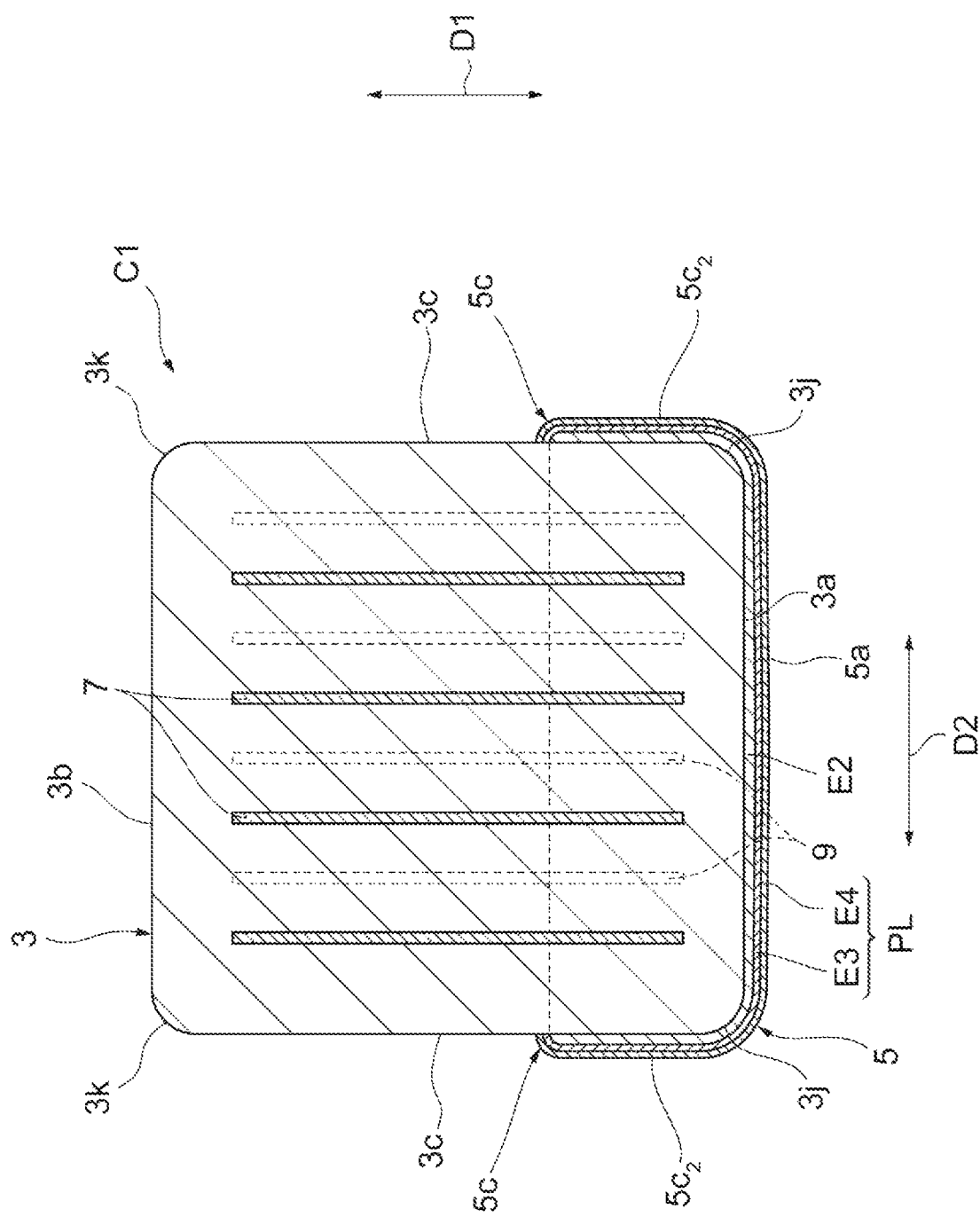
FIG. 5 is a view illustrating a cross-sectional configuration of the multilayer capacitor according to the embodiment.
Figure 6:
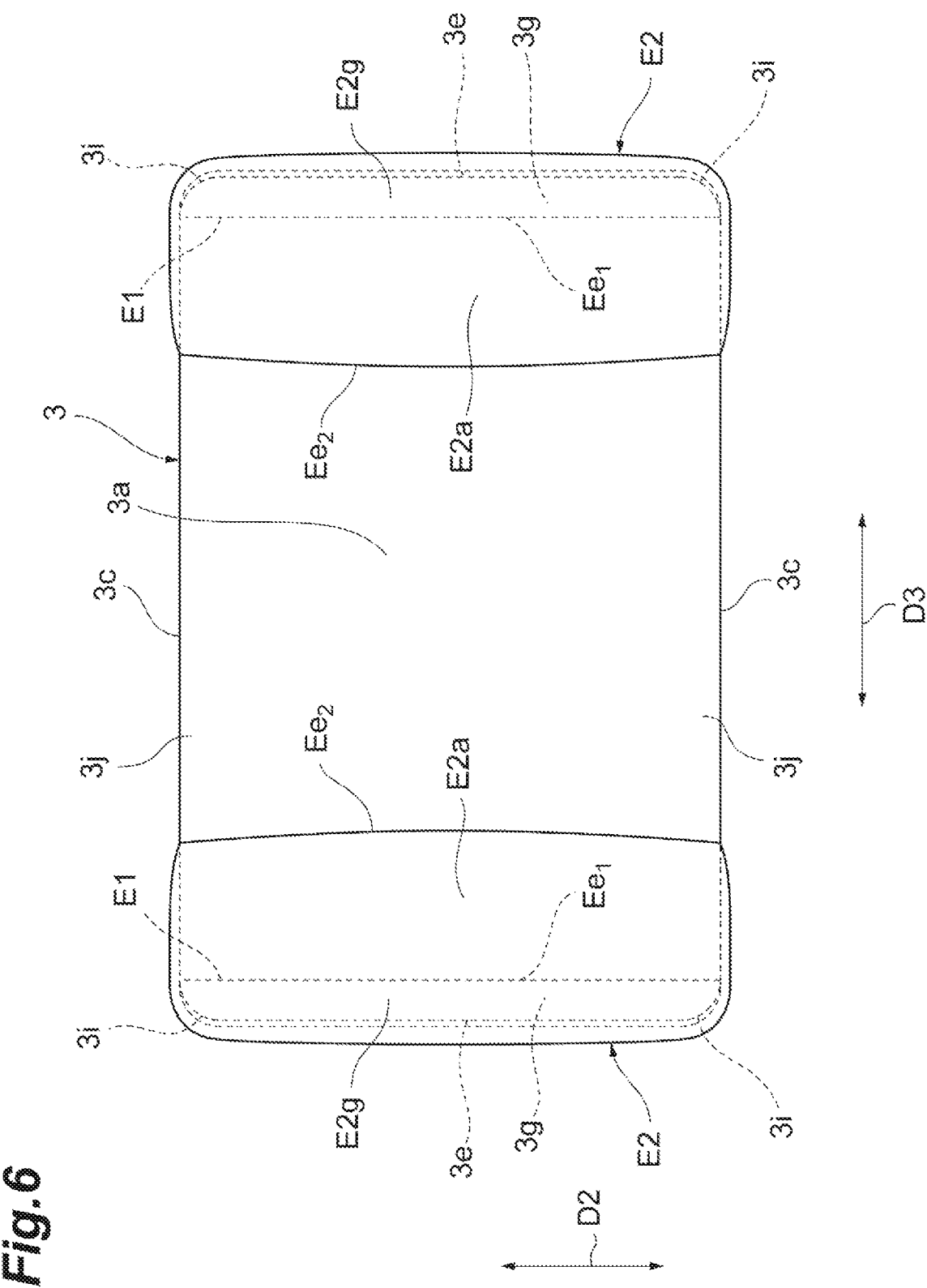
FIG. 6 is a plan view illustrating an element body, a first electrode layer, and a second electrode layer.
Figure 7:
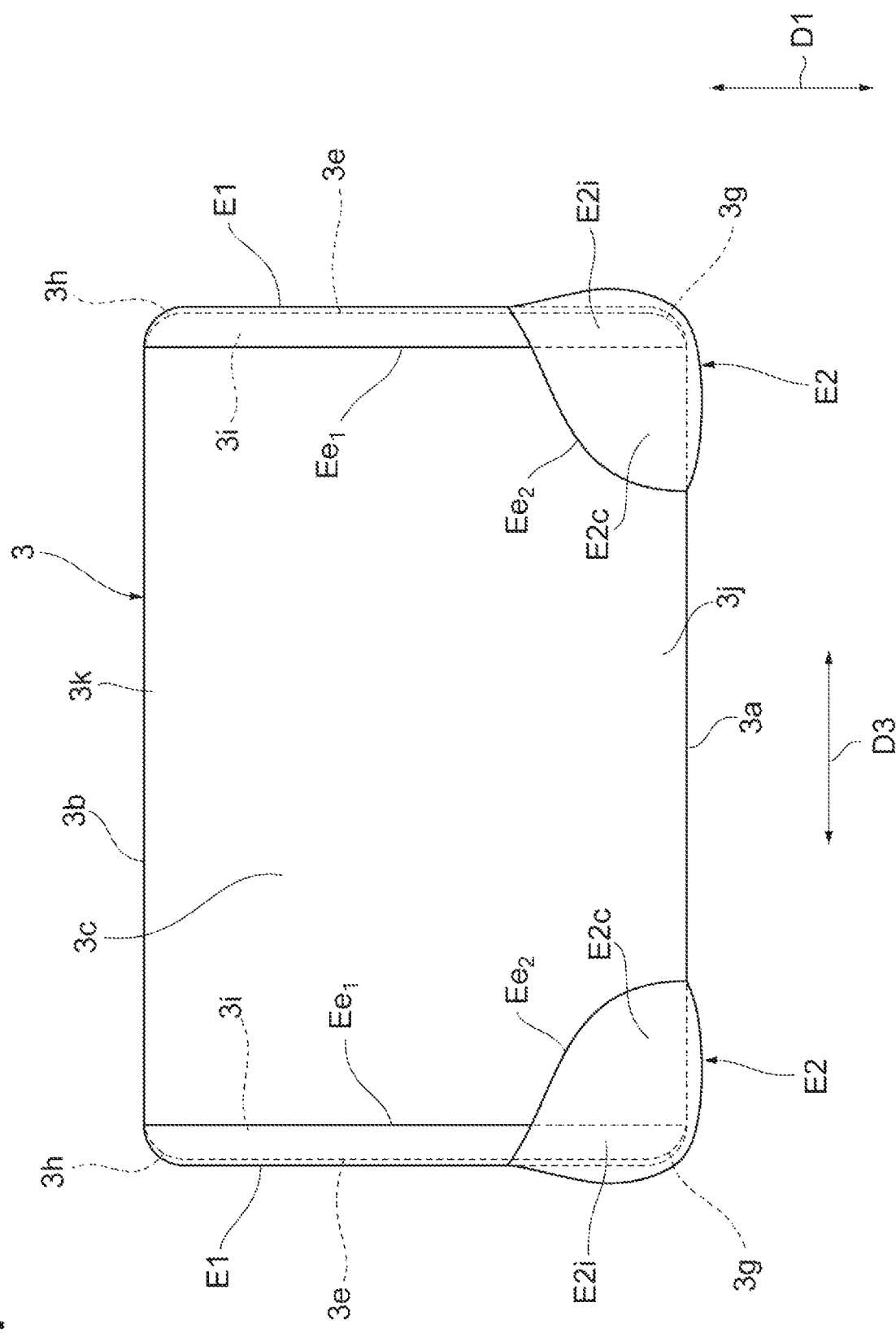
FIG. 7 is a side view illustrating the element body, the first electrode layer, and the second electrode layer.
Figure 8:
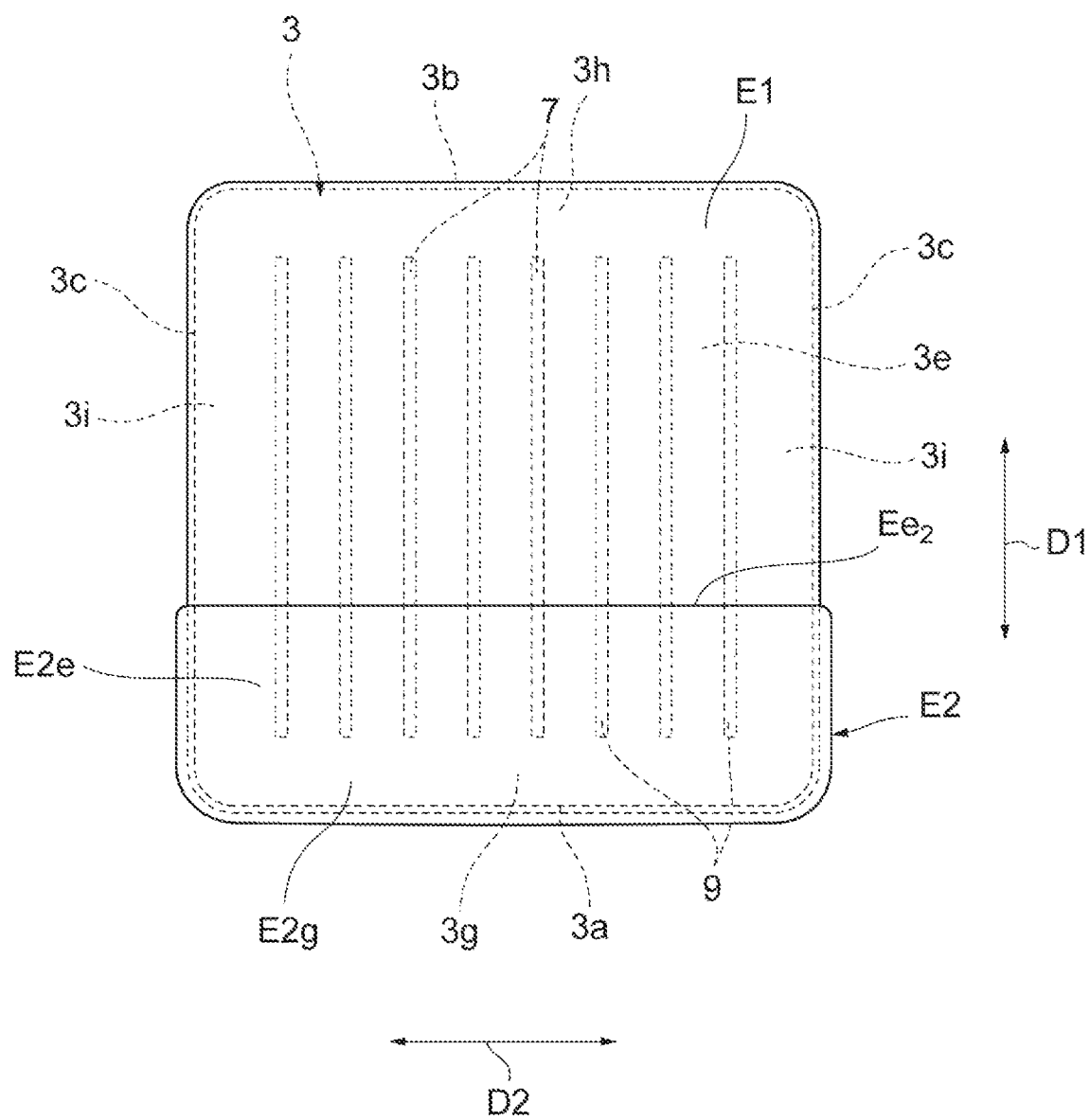
FIG. 8 is an end view illustrating the element body, the first electrode layer, and the second electrode layer.
Figure 9:
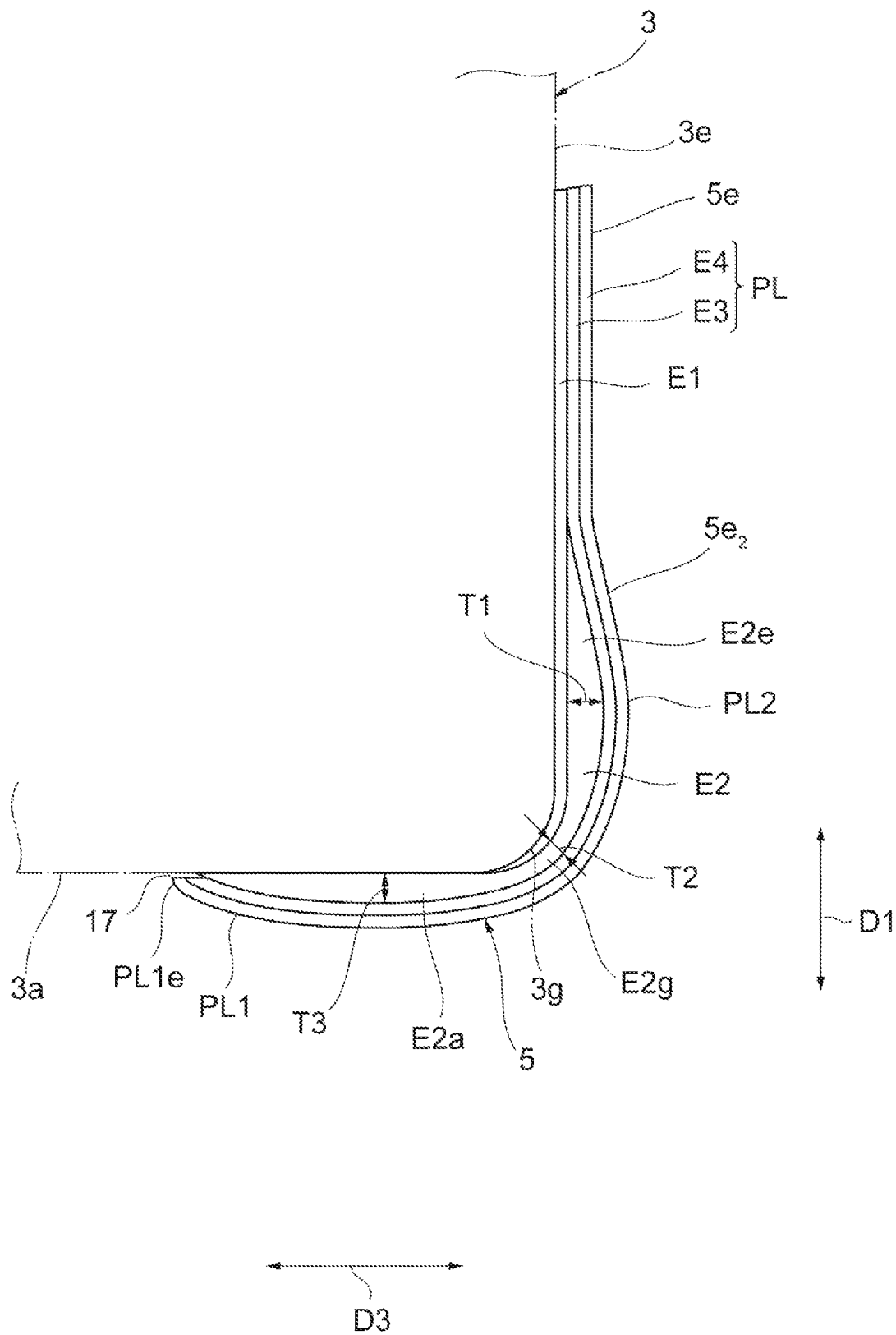
FIG. 9 is a view illustrating a cross-sectional configuration of an external electrode.

A configuration of a multilayer capacitor C1 according to an embodiment will be described with reference to FIGS. 1 to 9. FIG. 1 is a perspective view of a multilayer capacitor according to the embodiment. FIG. 2 is a side view of the multilayer capacitor according to the embodiment. FIGS. 3 to 5 are views illustrating a cross-sectional configuration of the multilayer capacitor according to the embodiment. FIG. 6 is a plan view illustrating an element body, a first electrode layer, and a second electrode layer. FIG. 7 is a side view illustrating the element body, the first electrode layer, and the second electrode layer. FIG. 8 is an end view illustrating the element body, the first electrode layer, and the second electrode layer. FIG. 9 is a view illustrating a cross-sectional configuration of an external electrode. In the present embodiment, an electronic component is, for example, the multilayer capacitor C1.

As illustrated in FIG. 1, the multilayer capacitor C1 includes an element body 3 of a rectangular parallelepiped shape and a plurality of external electrodes 5. In the present embodiment, the multilayer capacitor C1 includes a pair of external electrodes 5. The pair of external electrodes 5 is disposed on the element body 3. The pair of external electrodes 5 is separated from each other. The rectangular parallelepiped shape includes a rectangular parallelepiped shape in which corners and ridges are chamfered, and a rectangular parallelepiped shape in which the corners and ridges are rounded.

The element body 3 includes a pair of principal surfaces 3a and 3b opposing each other, a pair of side surfaces 3c opposing each other, and a pair of end surfaces 3e opposing each other. The pair of principal surfaces 3a and 3b, the pair of side surfaces 3c, and the pair of end surfaces 3e have a rectangular shape. The direction in which the pair of principal surfaces 3a and 3b opposes each other is a first direction D1. The direction in which the pair of side surfaces 3c opposes each other is a second direction D2. The direction in which the pair of end surfaces 3e opposes each other is a third direction D3. The multilayer capacitor C1 is solder-mounted on an electronic device. The electronic device includes, for example, a circuit board or an electronic component. The principal surface 3a of the multilayer capacitor C1 opposes the electronic device. The principal surface 3a is arranged to constitute a mounting surface. The principal surface 3a is the mounting surface.

The first direction D1 is a direction orthogonal to the respective principal surfaces 3a and 3b and is orthogonal to the second direction D2. The third direction D3 is a direction parallel to the respective principal surfaces 3a and 3b and the respective side surfaces 3c, and is orthogonal to the first direction D1 and the second direction D2. The second direction D2 is a direction orthogonal to the respective side surfaces 3c. The third direction D3 is a direction orthogonal to the respective end surfaces 3e. In the present embodiment, a length of the element body 3 in the third direction D3 is larger than a length of the element body 3 in the first direction D1, and larger than a length of the element body 3 in the second direction D2. The third direction D3 is a longitudinal direction of the element body 3. The length of the element body 3 in the first direction D1 and the length of the element body 3 in the second direction D2 may be equivalent to each other. The length of the element body 3 in the first direction D1 and the length of the element body 3 in the second direction D2 may be different from each other.

The length of the element body 3 in the first direction D1 is a height of the element body 3. The length of the element body 3 in the second direction D2 is a width of the element body 3. The length of the element body 3 in the third direction D3 is a length of the element body 3. In the present embodiment, the element body 3 has a height of 0.5 to 2.5 mm, a width of 0.5 to 5.0 mm, and a length of 1.0 to 5.7 mm. The element body 3 has, for example, a height of 2.5 mm, a width of 2.5 mm, and a length of 3.2 mm.

The pair of side surfaces 3c extends in the first direction D1 to couple the pair of principal surfaces 3a and 3b. The pair of side surfaces 3c also extends in the third direction D3. The pair of end surfaces 3e extends in the first direction D1 to couple the pair of principal surfaces 3a and 3b. The pair of end surfaces 3e extends in the second direction D2.

The element body 3 includes a pair of ridge portions 3g, a pair of ridge portions 3h, four ridge portions 3i, a pair of ridge portions 3j, and a pair of ridge portions 3k. The ridge portion 3g is positioned between the end surface 3e and the principal surface 3a. The ridge portion 3h is positioned between the end surface 3e and the principal surface 3b. The ridge portion 3i is positioned between the end surface 3e and the side surface 3c. The ridge portion 3j is positioned between the principal surface 3a and the side surface 3c. The ridge portion 3k is positioned between the principal surface 3b and the side surface 3c. In the present embodiment, each of the ridge portions 3g, 3h, 3i, 3j, and 3k is rounded to curve. The element body 3 is subject to what is called a round chamfering process.

The end surface 3e and the principal surface 3a are indirectly adjacent to each other with the ridge portion 3g between the end surface 3e and the principal surface 3a. The end surface 3e and the principal surface 3b are indirectly adjacent to each other with the ridge portion 3h between the end surface 3e and the principal surface 3b. The end surface 3e and the side surface 3c are indirectly adjacent to each other with the ridge portion 3i between the end surface 3e and the side surface 3c. The principal surface 3a and the side surface 3c are indirectly adjacent to each other with the ridge portion 3j between the principal surface 3a and the side surface 3c. The principal surface 3b and the side surface 3c are indirectly adjacent to each other with the ridge portion 3k between the principal surface 3b and the side surface 3c.

The element body 3 is configured by laminating a plurality of dielectric layers in the second direction D2. The element body 3 includes the plurality of laminated dielectric layers. In the element body 3, a lamination direction of the plurality of dielectric layers coincides with the second direction D2. Each dielectric layer includes, for example, a sintered body of a ceramic green sheet containing a dielectric material. The dielectric material includes, for example, a dielectric ceramic of $BaTiO_3$ base, $Ba(Ti, Zr)O_3$ base, or $(Ba, Ca)TiO_3$ base. In an actual element body 3, each of the dielectric layers is integrated to such an extent that a boundary between the dielectric layers cannot be visually recognized. In the element body 3, the lamination direction of the plurality of dielectric layers may coincide with the first direction D1.

As illustrated in FIGS. 3 to 5, the multilayer capacitor C1 includes a plurality of internal electrodes 7 and a plurality of internal electrodes 9. Each of the internal electrodes 7 and 9 is an internal conductor disposed in the element body 3. Each of the internal electrodes 7 and 9 is made of a conductive material that is commonly used as an internal conductor of a multilayer electronic component. The conductive material includes, for example, a base metal. The conductive material includes, for example, Ni or Cu. Each of the internal electrodes 7 and 9 is configured as a sintered body of conductive paste containing the conductive material described above. In the present embodiment, the internal electrodes 7 and 9 are made of Ni.

The internal electrodes 7 and the internal electrodes 9 are disposed in different positions (layers) in the second direction D2. The internal electrodes 7 and the internal electrodes 9 are alternately disposed in the element body 3 to oppose each other in the second direction D2 with an interval therebetween. Polarities of the internal electrodes 7 and the internal electrodes 9 are different from each other. In a case in which the lamination direction of the plurality of dielectric layers is the first direction D1, the internal electrodes 7 and the internal electrodes 9 are disposed in different positions (layers) in the first direction D1. One end of each of the internal electrodes 7 and 9 is exposed to a corresponding end surface 3e of the pair of the end surfaces 3e. Each of the internal electrodes 7 and 9 includes the one end exposed to the corresponding end surface 3e.

The plurality of internal electrodes 7 and the plurality of internal electrodes 9 are alternately disposed in the second direction D2. The internal electrodes 7 and 9 are positioned in a plane approximately parallel to the side surfaces 3c. The internal electrodes 7 and the internal electrodes 9 oppose each other in the second direction D2. The direction (second direction D2) in which the internal electrodes 7 and the internal electrodes 9 oppose each other is orthogonal to the direction (first direction D1 and third direction D3) parallel to the side surfaces 3c. In a case in which the lamination direction of the plurality of dielectric layers is the first direction D1, the plurality of internal electrodes 7 and the plurality of internal electrodes 9 are alternately disposed in the first direction D1. In this case, the internal electrodes 7 and 9 are positioned in a plane approximately parallel to the principal surfaces 3a and 3b. The internal electrodes 7 and the internal electrodes 9 oppose each other in the first direction D1.

As illustrated in FIG. 1, the external electrodes 5 are disposed at both end portions of the element body 3 in the third direction D3. Each of the external electrodes 5 is disposed on the corresponding end surface 3e side of the element body 3. The external electrode 5 is disposed on at least the principal surface 3a and end surface 3e adjacent to each other. As illustrated in FIGS. 2 to 5, the external electrode 5 includes a plurality of electrode portions 5a, 5b, 5c, and 5e. The electrode portion 5a is disposed on the principal surface 3a and the ridge portion 3g. The electrode portion 5b is disposed on the ridge portion 3h. The electrode portion 5c is disposed on each side surface 3c and each ridge portion 3i. The electrode portion 5e is disposed on the corresponding end surface 3e. The external electrode 5 also includes electrode portions disposed on the ridge portions 3j. Each of the external electrodes 5 is disposed on at least the end surface 3e.

The external electrode 5 is formed on the four surfaces, that is, the principal surface 3a, the end surface 3e, and the pair of side surfaces 3c, as well as on the ridge portions 3g, 3h, 3i, and 3j. The electrode portions 5a, 5b, 5c, and 5e adjacent each other are coupled and are electrically connected to each other. Each electrode portion 5e covers all the one ends of the corresponding internal electrodes 7 or 9. The electrode portion 5e is directly connected to the corresponding internal electrodes 7 or 9. The external electrode 5 is electrically connected to the corresponding internal electrodes 7 or 9. As illustrated in FIGS. 3 to 5, the external electrode 5 includes a first electrode layer E1, a second electrode layer E2, a third electrode layer E3, and a fourth electrode layer E4. The fourth electrode layer E4 is arranged to constitute the outermost layer of the external electrode 5. Each of the electrode portions 5a, 5c, and 5e includes the first electrode layer E1, the second electrode layer E2, the third electrode layer E3, and the fourth electrode layer E4. The electrode portion 5b includes the first electrode layer E1, the third electrode layer E3, and the fourth electrode layer E4.

The first electrode layer E1 included in the electrode portion 5a is disposed on the ridge portion 3g, and is not disposed on the principal surface 3a. The first electrode layer E1 included in the electrode portion 5a is formed to cover the entire ridge portion 3g. The first electrode layer E1 is not formed on the principal surface 3a. The first electrode layer E1 included in the electrode portion 5a is in contact with the entire ridge portion 3g. The principal surface 3a is not covered with the first electrode layer E1, and is exposed from the first electrode layer E1. The first electrode layer E1 included in the electrode portion 5a may be disposed on the principal surface 3a. In this case, the first electrode layer E1 included in the electrode portion 5a is formed to cover one part of the principal surface 3a and the entire ridge portion 3g. That is, the first electrode layer E1 included in the electrode portion 5a is also in contact with the one part of the principal surface 3a. The one part of the principal surface 3a is, for example, the partial region near the end surface 3e, in the principal surface 3a.

The second electrode layer E2 included in the electrode portion 5a is disposed on the first electrode layer E1 and on the principal surface 3a. In the electrode portion 5a, the second electrode layer E2 covers the entire first electrode layer E1. In the electrode portion 5a, the second electrode layer E2 is in contact with the entire first electrode layer E1. The second electrode layer E2 included in the electrode portion 5a is in contact with one part of the principal surface 3a. The one part of the principal surface 3a is, for example, the partial region near the end surface 3e, in the principal surface 3a. That is, the one part of the principal surface 3a is close to the end surface 3e. The second electrode layer E2 included in the electrode portion 5a includes a region E$\eta$a positioned on the principal surface 3a. The electrode portion 5a is four-layered on the ridge portion 3g, and is three-layered on the principal surface 3a. The second electrode layer E2 included in the electrode portion 5a is formed to cover the one part of the principal surface 3a and the entire ridge portion 3g. As described above, the one part of the principal surface 3a is, for example, the partial region near the end surface 3e, in the principal surface 3a.

The second electrode layer E2 included in the electrode portion 5a indirectly covers the entire ridge portion 3g and the one part of the principal surface 3a in such a manner that the first electrode layer E1 is positioned between the second electrode layer E2 and the element body 3. The second electrode layer E2 included in the electrode portion 5a directly covers the one part of the principal surface 3a. The second electrode layer E2 included in the electrode portion 5a directly covers an entire portion of the first electrode layer E1 formed on the ridge portion 3g. In a case in which the first electrode layer E1 included in the electrode portion 5a is disposed on the principal surface 3a, the electrode portion 5a is four-layered on the principal surface 3a and the ridge portion 3g. In a case in which the first electrode layer E1 included in the electrode portion 5a is disposed on the principal surface 3a, the region E2a of the second electrode layer E2 includes a portion being in contact with the principal surface 3a and a portion being in contact with the first electrode layer E1.

The first electrode layer E1 included in the electrode portion 5b is disposed on the ridge portion 3h, and is not disposed on the principal surface 3b. The first electrode layer E1 included in the electrode portion 5b is formed to cover the entire ridge portion 3h. The first electrode layer E1 is not formed on the principal surface 3b. The first electrode layer E1 included in the electrode portion 5b is in contact with the entire ridge portion 3h. The principal surface 3b is not covered with the first electrode layer E1, and is exposed from the first electrode layer E1. The first electrode layer E1 included in the electrode portion 5b may be disposed on the principal surface 3b. In this case, the first electrode layer E1 included in the electrode portion 5b is formed to cover one part of the principal surface 3b and the entire ridge portion 3h. That is, the first electrode layer E1 included in the electrode portion 5b is also in contact with the one part of the principal surface 3b. The one part of the principal surface 3b is, for example, the partial region near the end surface 3e, in the principal surface 3b. The electrode portion 5b does not include the second electrode layer E2. The principal surface 3b is not covered with the second electrode layer E2, and is exposed from the second electrode layer E2. The second electrode layer E2 is not formed on the principal surface 3b. The electrode portion 5b is three-layered.

The first electrode layer E1 included in the electrode portion 5c is disposed on the ridge portion 3i, and is not disposed on the side surface 3c. The first electrode layer E1 included in the electrode portion 5c is formed to cover the entire ridge portion 3i. The first electrode layer E1 is not formed on the side surface 3c. The first electrode layer E1 included in the electrode portion 5c is in contact with the entire ridge portion 3i. The side surface 3c is not covered with the first electrode layer E1, and is exposed from the first electrode layer E1. The first electrode layer E1 included in the electrode portion 5c may be disposed on the side surface 3c. In this case, the first electrode layer E1 included in the electrode portion 5c is formed to cover one part of the side surface 3c and the entire ridge portion 3i. That is, the first electrode layer E1 included in the electrode portion 5c is also in contact with the one part of the side surface 3c. The one part of the side surface 3c is, for example, the partial region near the end surface 3e, in the side surface 3c.

The second electrode layer E2 included in the electrode portion 5c is disposed on the first electrode layer E1 and on the side surface 3c. In the electrode portion 5c, the second electrode layer E2 covers one part of the first electrode layer E1. In the electrode portion 5c, the second electrode layer E2 is in contact with one part of the side surface 3c and the one part of the first electrode layer E1. The second electrode layer E2 included in the electrode portion 5c includes a region E2c positioned on the side surface 3c. The second electrode layer E2 included in the electrode portion 5c is formed to cover one part of the ridge portion 3i and the one part of the side surface 3c. The one part of the ridge portion 3i is, for example, a partial region near the principal surface 3a, in the ridge portion 3i. That is, the one part of the ridge portion 3i is close to the principal surface 3a. The one part of the side surface 3c is, for example, a corner region near the principal surface 3a and end surface 3e, in the side surface 3c. That is, the one part of the side surface 3c is close to the principal surface 3a and end surface 3e. The second electrode layer E2 included in the electrode portion 5c indirectly covers the one part of the ridge portion 3i in such a manner that the first electrode layer E1 is positioned between the second electrode layer E2 and the element body 3. The second electrode layer E2 included in the electrode portion 5c indirectly covers the one part of the ridge portion 3i. The second electrode layer E2 included in the electrode portion 5c directly covers the one part of the side surface 3c. The second electrode layer E2 included in the electrode portion 5c directly covers a part of the portion of the first electrode layer E1 formed on the ridge portion 3i. In a case in which the first electrode layer E1 included in the electrode portion 5c is disposed on the side surface 3c, the region E2c of the second electrode layer E2 includes a portion being in contact with the side surface 3c and a portion being in contact with the first electrode layer E1.

The electrode portion 5c includes a plurality of regions $5c_1$ and $5c_2$. In the present embodiment, the electrode portion 5c includes only two regions $5c_1$ and $5c_2$. The region $5c_2$ is positioned closer to the principal surface 3a than the region $5c_1$. The region $5c_1$ includes the first electrode layer E1, the third electrode layer E3, and the fourth electrode layer E4. The region $5c_1$ does not include the second electrode layer E2. The region $5c_1$ is three-layered. The region $5c_2$ includes the first electrode layer E1, the second electrode layer E2, the third electrode layer E3, and the fourth electrode layer E4. The regions $5c_2$ is four-layered on the ridge portion 3i, and is three-layered on the side surface 3c. The region $5c_1$ is the region where the first electrode layer E1 is exposed from the second electrode layer E2. The region $5c_2$ is the region where the first electrode layer E1 is covered with the second electrode layer E2. The region $5c_2$ includes the region E2c.

The first electrode layer E1 included in the electrode portion 5e is disposed on the end surface 3e. The end surface 3e is entirely covered with the first electrode layer E1. The first electrode layer E1 included in the electrode portion 5e is in contact with the entire end surface 3e. The second electrode layer E2 included in the electrode portion 5e is disposed on the first electrode layer E1. In the electrode portion 5e, one part of the first electrode layer E1 is covered with the second electrode layer E2. In the electrode portion 5e, the second electrode layer E2 is in contact with the one part of the first electrode layer E1. The second electrode layer E2 included in the electrode portion 5e includes a region E2e positioned on the end surface 3e. The second electrode layer E2 included in the electrode portion 5e is formed to cover one part of the end surface 3e. The one part of the end surface 3e is, for example, a partial region near the principal surface 3a, in the end surface 3e. That is, the one part of the end surface 3e is close to the principal surface 3a. The second electrode layer E2 included in the electrode portion 5e indirectly covers the one part of the side surface 3e in such a manner that the first electrode layer E1 is positioned between the second electrode layer E2 and the element body 3. The second electrode layer E2 included in the electrode portion 5e directly covers a part of the portion of the first electrode layer E1 formed on the end surface 3e. In the electrode portion 5e, the first electrode layer E1 is formed on the end surface 3e to be coupled to the one ends of the corresponding internal electrodes 7 or 9.

The electrode portion 5e includes a plurality of regions $5e_1$ and $5e_2$. In the present embodiment, the electrode portion 5e includes only two regions $5e_1$ and $5e_2$. The region $5e_2$ is positioned closer to the principal surface 3a than the region $5e_1$. The region $5e_1$ includes the first electrode layer E1, the third electrode layer E3, and the fourth electrode layer E4. The region $5e_1$ does not include the second electrode layer E2. The region $5e_1$ is three-layered. The region $5e_2$ includes the first electrode layer E1, the second electrode layer E2, the third electrode layer E3, and the fourth electrode layer E4. The third electrode layer E3 and fourth electrode later E4 included in the electrode portion 5e are formed to cover the entire end surface 3e when viewed from the third direction D3. In the present embodiment, the third electrode layer E3 and fourth electrode later E4 indirectly cover the entire end surface 3e. The regions $5e_2$ is four-layered. The region $5e_1$ is the region where the first electrode layer E1 is exposed from the second electrode layer E2. The region $5e_2$ is the region where the first electrode layer E1 is covered with the second electrode layer E2. The region $5e_2$ includes the region E2e.

The first electrode layer E1 is formed by sintering conductive paste applied onto a surface of the element body 3. The first electrode layer E1 is foamed to cover the end surface 3e and the ridge portions 3g, 3h, and 3i. The first electrode layer E1 is formed by sintering a metal component (metal powder) contained in the conductive paste. The first electrode layer E1 includes a sintered metal layer. The first electrode layer E1 includes a sintered metal layer formed on the element body 3. The first electrode layer E1 is not intentionally formed on the pair of principal surfaces 3a and 3b and the pair of side surfaces 3c. The first electrode layer E1 may be unintentionally formed on the principal surfaces 3a and 3b and the side surfaces 3c due to a production error, for example. In the present embodiment, the first electrode layer E1 is a sintered metal layer made of Cu. The first electrode layer E1 may be a sintered metal layer made of Ni. The first electrode layer E1 contains a base metal. The conductive paste contains, for example, powder made of Cu or Ni, a glass component, an organic binder, and an organic solvent. The first electrode layer E1 included in the electrode portion 5a, the first electrode layer E1 included in the electrode portion 5b, the first electrode layer E1 included in the electrode portion 5c, and the first electrode layer E1 included in the electrode portion 5e are integrally formed.

The second electrode layer E2 is formed by curing conductive resin paste applied onto the first electrode layer E1, the principal surface 3a, and the pair of side surfaces 3c. The second electrode layer E2 is formed over the first electrode layer E1 and the element body 3. The first electrode layer E1 is an underlying metal layer for forming the second electrode layer E2. The second electrode layer E2 is a conductive resin layer covering the first electrode layer E1. The second electrode layer E2 includes a conductive resin layer. The conductive resin paste contains, for example, a resin, a conductive material, and an organic solvent. The resin is, for example, a thermosetting resin. The conductive material includes, for example, metal powder. The metal powder includes, for example, Ag powder or Cu powder. The thermosetting resin includes, for example, a phenolic resin, an acrylic resin, a silicone resin, an epoxy resin, or a polyimide resin.

In the present embodiment, the second electrode layer E2 covers a partial region of the first electrode layer E1. The partial region of the first electrode layer E1 includes, for example, the regions corresponding to the electrode portion 5a, the region $5c_2$ of the electrode portion 5c, and the region $5e_2$ of the electrode portion 5e, in the first electrode layer E1. The second electrode layer E2 directly covers a partial region of the ridge portion 3j. The partial region of the ridge portion 3j is, for example, the partial region near the end surface 3e, in the ridge portion 3j. That is, the partial region of the ridge portion 3j is close to the end surface 3e. The second electrode layer E2 is in contact with the partial region of the ridge portion 3j. The second electrode layer E2 included in the electrode portion 5a, the second electrode layer E2 included in the electrode portion 5b, the second electrode layer E2 included in the electrode portion 5c, and the second electrode layer E2 included in the electrode portion 5e are integrally formed.

The third electrode layer E3 is formed on the second electrode layer E2 by plating method. In the present embodiment, the third electrode layer E3 is formed on the second electrode layer E2 by Ni plating. The third electrode layer E3 is a Ni plating layer. The third electrode layer E3 may be an Sn plating layer, a Cu plating layer, or an Au plating layer. The third electrode layer E3 contains Ni, Sn, Cu, or Au. The Ni plating layer has better solder leach resistance than the metal contained in the second electrode layer E2.

The fourth electrode layer E4 is formed on the third electrode layer E3 by plating method. The fourth electrode layer E4 includes a solder plating layer. In the present embodiment, the fourth electrode layer E4 is formed on the third electrode layer E3 by Sn plating. The fourth electrode layer E4 is an Sn plating layer. The fourth electrode layer E4 may be an Sn—Ag alloy plating layer, an Sn—Bi alloy plating layer, or an Sn—Cu alloy plating layer. The fourth electrode layer E4 contains Sn, Sn—Ag alloy, Sn—Bi alloy, or Sn—Cu alloy.

The third electrode layer E3 and the fourth electrode layer E4 constitute a plating layer PL formed on the second electrode layer E2. In the present embodiment, the plating layer PL formed on the second electrode layer E2 is two-layered. The third electrode layer E3 is an intermediate plating layer positioned between the fourth electrode layer E4 arranged to constitute the outermost layer and the second electrode layer E2. The third electrode layer E3 included in the electrode portion 5a, the third electrode layer E3 included in the electrode portion 5b, the third electrode layer E3 included in the electrode portion 5c, and the third electrode layer E3 included in the electrode portion 5e are integrally formed. The fourth electrode layer E4 included in the electrode portion 5a, the fourth electrode layer E4 included in the electrode portion 5b, the fourth electrode layer E4 included in the electrode portion 5c, and the fourth electrode layer E4 included in the electrode portion 5e are integrally formed.

The first electrode layer E1 (first electrode layer E1 included in the electrode portion 5e) is formed on the end surface 3e to be connected to the corresponding internal electrodes 7 or 9. The first electrode layer E1 covers the entire end surface 3e, the entire ridge portion 3g, the entire ridge portion 3h, and the entire ridge portion 3i. The second electrode layer E2 (second electrode layers E2 included in the electrode portions 5a, 5c, and 5e) continuously covers one part of the principal surface 3a, one part of the end surface 3e, and one part of each of the pair of side surfaces 3c. The second electrode layer E2 (second electrode layers E2 included in the electrode portions 5a, 5c, and 5e) covers the entire ridge portion 3g, one part of the ridge portion 3i, and one part of the ridge portion 3j. The second electrode layer E2 includes a plurality of portions each corresponding to the one part of the principal surface 3a, the one part of the end surface 3e, the one part of each of the pair of side surfaces 3c, the entire ridge portion 3g, the one part of the ridge portion 3i, and the one part of the ridge portion 3j. The first electrode layer E1 (first electrode layer E1 included in the electrode portion 5e) is directly connected to the corresponding internal electrodes 7 or 9.

The first electrode layer E1 (first electrode layers E1 included in the electrode portions 5a, 5b, 5c, and 5e) includes a region covered with the second electrode layer E2 (second electrode layers E2 included in the electrode portions 5a, 5c, and 5e), and a region not covered with the second electrode layer E2 (second electrode layers E2 included in the electrode portions 5a, 5c, and 5e). The region not covered with the second electrode layer E2 is a region exposed from the second electrode layer E2. The third electrode layer E3 and the fourth electrode layer E4 cover the region not covered with the second electrode layer E2 in the first electrode layer E1, and the second electrode layer E2.

As illustrated in FIG. 6, when viewed from the first direction D1, the first electrode layer E1 (first electrode layer E1 included in the electrode portion 5a) is entirely covered with the second electrode layer E2. When viewed from the first direction D1, the first electrode layer E1 (first electrode layer E1 included in the electrode portion 5a) is not exposed from the second electrode layer E2.

As illustrated in FIG. 7, when viewed from the second direction D2, a first end region near the principal surface 3a of the first electrode layer E1 is covered with the second electrode layer E2. The first end region of the first electrode layer E1 includes the first electrode layer E1 included in the region $5c_2$. The first end region of the first electrode layer E1 is close to the principal surface 3a. When viewed from the second direction D2, an end edge $Ee_2$ of the second electrode layer E2 crosses an end edge $Ee_1$ of the first electrode layer E1. When viewed from the second direction D2, a second end region near the principal surface 3b of the first electrode layer E1 is exposed from the second electrode layer E2. The second end region of the first electrode layer E1 includes the first electrode layer E1 included in the region $5c_1$. The second end region of the first electrode layer E1 is close to the principal surface 3b.

As illustrated in FIG. 8, when viewed from the third direction D3, a third end region near the principal surface 3a of the first electrode layer E1 is covered with the second electrode layer E2. The third end region of the first electrode layer E1 includes the first electrode layer E1 included in the region $5e_2$. The third end region of the first electrode layer E1 is close to the principal surface 3a. When viewed from the third direction D3, the end edge $Ee_2$ of the second electrode layer E2 is positioned on the first electrode layer E1. When viewed from the third direction D3, a fourth end region near the principal surface 3b of the first electrode layer E1 is exposed from the second electrode layer E2. The fourth end region of the first electrode layer E1 includes the first electrode layer E1 included in the region $5e_1$. The fourth end region of the first electrode layer E1 is close to the principal surface 3b.

In the multilayer capacitor C1, the second electrode layer E2 continuously covers only the one part of the principal surface 3a, only the one part of the end surface 3e, and only the one part of each of the pair of side surfaces 3c. The second electrode layer E2 covers the entire ridge portion 3g, only the one part of the ridge portion 3i, and only the one part of the ridge portion 3j. The portion of the first electrode layer E1 covering the ridge portion 3i is partially exposed from the second electrode layer E2. For example, the first electrode layer E1 included in the region $5c_1$ is exposed from the second electrode layer E2.

As illustrated in FIG. 9, the second electrode layer E2 is disposed to continuously cover a part of the principal surface 3a and a part of the end surface 3e. The second electrode layer E2 includes the region E2e positioned on the end surface 3e, the region E2a positioned on the principal surface 3a, and a region E2g positioned on the ridge portion 3g. The region E2e is the second electrode layer E2 included in the region $5e_2$ of the electrode portion 5e. The region E2a and the region E2g are the second electrode layer E2 included in the electrode portion 5a. In a case where the region E2e constitutes the first region, for example, the region E2g constitutes the second region and the region E2a constitutes the third region.

A maximum thickness T1 (μm) of the region E2e and a minimum thickness T2 (μm) of the region E2g satisfy a relation of $T2/T1 \geq 0.26$.

The maximum thickness T1 and a maximum thickness T3 (μm) of the region E2a may satisfy a relation of $T3/T1 \geq 0.49$.

The maximum thickness T1 is a maximum thickness of the second electrode layer E2 on the end surface 3e. The minimum thickness T2 is a minimum thickness of the second electrode layer E2 on the ridge portion 3g. The maximum thickness T3 is a maximum thickness of the second electrode layer E2 on the principal surface 3a. The maximum thickness T3 may be smaller than the minimum thickness T2.

The maximum thickness T1 and the minimum thickness T2 may satisfy a relation of $T2/T1 \leq 0.91$.

The maximum thickness T1 and the maximum thickness T3 may satisfy a relation of $T3/T1 \leq 1.88$.

The maximum thickness T1, the minimum thickness T2, and the maximum thickness T3 can be determined, for example, as follows.

A cross-sectional photograph of the multilayer capacitor C1 including the second electrode layer E2 is obtained. The cross-sectional photograph is obtained, for example, by capturing a cross-section of the multilayer capacitor C1 taken along a plane that is parallel to the pair of side surfaces 3c and is equidistant from the pair of side surfaces 3c. Each of the thicknesses T1, T2, and T3 of the second electrode layer E2 on the obtained cross-sectional photograph is calculated. The maximum thickness T1 is a maximum value of the thickness of the region E2e in the third direction D3. The minimum thickness T2 is a minimum value of the thickness of the region E2g in the first direction D1. The thickness of the region E2g is, for example, a thickness of the ridge portion 3g in the normal direction. The maximum thickness T3 is a maximum value of the thickness of the region E2a.

As illustrated in FIG. 9, in a cross-section orthogonal to the principal surface 3a and the end surface 3e, a surface of the region E2a curves in a convex shape in a direction away from the principal surface 3a. The thickness of the region E2a is gradually reduced from a position of the maximum thickness of the region E2a toward an end edge of the region E2a. In the present embodiment, the surface of the region E2a curves due to the change in thickness of the region E2a.

As illustrated in FIG. 6, when viewed from the first direction D1, the end edge Ee₂ of the region E2a (the second electrode layer E2) curves. In the present embodiment, when viewed from the first direction D1, a length of the region E2a in the third direction D3 is larger at the center of the region E2a in the second direction D2 than in an end of the region E2a in the second direction D2. The length of the region E2a in the third direction D3 is largest at the center of the region E2a in the second direction D2, and is gradually reduced toward the end of the region E2a in the second direction D2.

The plating layer PL includes the third electrode layer E3 and the fourth electrode layer E4 as described above. The plating layer PL includes a portion PL1 positioned on the region E2a and a portion PL2 positioned on the region E2e. The portion PL1 includes an end edge PL1e. The plating layer PL (the third electrode layer E3 and the fourth electrode layer E4) is away from the element body 3. As illustrated in FIG. 9, a gap 17 is formed between the end edge PL1e and the element body 3 (the principal surface 3a). The width of the gap 17 is, for example, larger than 0 (zero) and equal to or smaller than 3 μm. In the present embodiment, the portion PL2 includes no end edge because the entirety of the end surface 3e is covered with the external electrode 5. The first electrode layer E1 and the second electrode layer E2 are positioned between the portion PL2 and the element body 3. Therefore, no gap is formed between the portion PL2 and the element body 3.

The plating layer PL includes a portion positioned on the region E2c, though not illustrated in the drawing. The portion positioned on the region E2c includes an end edge. A gap is formed between the end edge included in the portion positioned on the region E2c and the element body 3 (the side surface 3c). The gap has a width, for example, larger than 0 (zero) and equal to or smaller than 3 μm.

The relationship among the maximum thickness T1, the minimum thickness T2, and the maximum thickness T3 is described.

The inventors carried out the following experiment in order to clarify a range of the maximum thickness T1, a range of the minimum thickness T2, and a range of the maximum thickness T3. The inventors prepared samples 1 to 11 that are different from one another in maximum thickness T1, minimum thickness T2, and maximum thickness T3, and confirmed an incidence ratio of the second electrode layer E2 in each of the samples 1 to 11. The result is illustrated in FIG. 10. FIG. 10 is a table illustrating the incidence ratio of the peel-off of the second electrode layer E2 in each of the samples.

Each of the samples 1 to 11 is a lot including a plurality of specimens. As described below, the specimens of the samples 1 to 11 are multilayer capacitors having the same configuration as one another except for the thicknesses T1, T2, and T3. In the specimens of the samples 1 to 11, the element body 3 has a height of 2.5 mm, a width of 2.5 mm, and a length of 3.2 mm.

Each of the specimens of the sample 1 has a maximum thickness T1 of 58 μm, a minimum thickness T2 of 12 μm, and a maximum thickness T3 of 13 μm.

Each of the specimens of the sample 2 has a maximum thickness T1 of 80 μm, a minimum thickness T2 of 20 μm, and a maximum thickness T3 of 40 μm.

Each of the specimens of the sample 3 has a maximum thickness T1 of 82 μm, a minimum thickness T2 of 21 μm, and a maximum thickness T3 of 49 μm.

Each of the specimens of the sample 4 has a maximum thickness T1 of 87 μm, a minimum thickness T2 of 25 μm, and a maximum thickness T3 of 54 μm.

Each of the specimens of the sample 5 has a maximum thickness T1 of 79 μm, a minimum thickness T2 of 29 μm, and a maximum thickness T3 of 39 μm.

Each of the specimens of the sample 6 has a maximum thickness T1 of 79 μm, a minimum thickness T2 of 29 μm, and a maximum thickness T3 of 42 μm.

Each of the specimens of the sample 7 has a maximum thickness T1 of 82 μm, a minimum thickness T2 of 30 μm, and a maximum thickness T3 of 49 μm.

Each of the specimens of the sample 8 has a maximum thickness T1 of 80 µm, a minimum thickness T2 of 32 µm, and a maximum thickness T3 of 86 µm.

Each of the specimens of the sample 9 has a maximum thickness T1 of 79 µm, a minimum thickness T2 of 29 µm, and a maximum thickness T3 of 119 µm.

Each of the specimens of the sample 10 has a maximum thickness T1 of 82 µm, a minimum thickness T2 of 62 µm, and a maximum thickness T3 of 124 µm.

Each of the specimens of the sample 11 has a maximum thickness T1 of 82 µm, a minimum thickness T2 of 75 µm, and a maximum thickness T3 of 154 µm.

The incidence ratio of the peel-off of the second electrode layer E2 was determined as follows.

As for each of the samples 1 to 11, twelve specimens were selected and the selected specimens were left in a thermo-hygrostat chamber for five hours. In the thermo-hygrostat chamber, the temperature is 121° C. and the relative humidity is 95%. After that, a reflow test was conducted three times on the specimens in a nitrogen atmosphere. In the reflow test, a peak temperature is 260° C.

After the reflow test, the specimens were cut along a plane orthogonal to the end surface 3e, and whether there is peel-off of the second electrode layer E2 in the cut surface was visually confirmed. The number of specimens in which peel-off occurs in the second electrode layer E2 was counted to calculate an incidence ratio (%) of the peel-off of the second electrode layer E2.

As a result of the experiment described above, as illustrated in FIG. 10, the inventors confirmed that, as compared with the samples 1 and 2, the incidence ratio of the peel-off of the second electrode layer E2 is significantly reduced in the samples 3 to 11. In the samples 3 to 9, there was no specimen in which peel-off occurs in the second electrode layer E2.

The plating layer PL covering the second electrode layer E2 tends to be cohesive contact with the second electrode layer E2, but tends not to be cohesive contact with the element body 3. This forms the gap 17 between the end edge PL1e of the plating layer PL and the element body 3. Even in a case where the moisture absorbed by the resin included in the second electrode layer E2 is gasified, the gas generated from the moisture reaches the gap 17, and the gas is emitted outside the external electrode 5 through the gap 17. Since the gas generated from the moisture is emitted outside the external electrode 5, stress tends not to act on the second electrode layer E2.

Since the region E2g is positioned between the region E2e and the region E2a, the region E2e is away from the gap 17. In the multilayer capacitor C1, the maximum thickness T1 and the minimum thickness T2 satisfy the relation of $T2/T1 \geq 0.26$.

Therefore, the gas generated from the moisture absorbed by the resin of the region E2e passes through the region E2g to reach the region E2a reliably. The gas that has reached the region E2a from the region E2e reaches the gap 17 reliably. The region E2a is closer to the gap 17 than to the region E2e. In a case in which the gas generated from the moisture absorbed by the resin of the region E2e reaches the gap 17 reliably, the gas generated from the moisture absorbed by the resin of the region E2a also reaches the gap 17 reliably.

In the multilayer capacitor C1, the gas generated from the moisture absorbed by the resin of the second electrode layer E2 (the region E2e) reaches the gap 17 reliably. The gas that has reached the gap 17 is emitted outside the external electrode 5, so that the stress tends not to act on the second electrode layer E2. Consequently, the multilayer capacitor C1 controls the peel-off of the second electrode layer E2.

As illustrated in FIG. 7, the second electrode layer E2 includes the region E2c positioned on the side surface 3c and the region E2i positioned on the ridge portion 3i. The gas generated from the moisture absorbed by the resin of the region E2e passes through the region E2i and the region E2c, and is emitted from the gap between the plating layer PL and the element body 3. However, an area of the region E2a and the region E2g is larger than an area of the region E2c and the region E2i, and the emission of the gas generated from the moisture absorbed by the resin of the second electrode layer E2 is dominant in the region E2a and the region E2g. Therefore, the region E2a and the region E2g principally contribute to controlling the peel-off of the second electrode layer E2.

The gap 17 is an outlet of the gas generated from the moisture absorbed by the resin of the second electrode layer E2, and is also an inlet of the moisture to the external electrode 5. The path through which the gas generated from the moisture absorbed by the resin of the region E2e reaches the gap 17 may serve as a path through which the moisture reaches the region E2e. The moisture that has reached the region E2e is absorbed in the region E2e. In this case, the gas generation amount may increase.

In the multilayer capacitor C1, the maximum thickness T1 and the minimum thickness T2 satisfy the relation of $T2/T1 \geq 0.91$.

Therefore, even in a case in which the moisture enters from the gap 17, the moisture tends not to reach the region E2e. The multilayer capacitor C1 reduces an increase in moisture absorbed in the second electrode layer E2 (the region E2e) and an increase in gas generated from the moisture. Consequently, the multilayer capacitor C1 further controls the peel-off of the second electrode layer E2.

In the multilayer capacitor C1, the maximum thickness T1 and the maximum thickness T3 satisfy the relation of $T3/T1 \geq 0.49$.

Therefore, the gas generated from the moisture absorbed by the resin further tends to move in the region E2a. In the multilayer capacitor C1, the gas generated from the moisture absorbed by the resin of the second electrode layer E2 (the region E2e) reaches the gap 17 more reliably, so that the stress further tends not to act on the second electrode layer E2. Consequently, the multilayer capacitor C1 further controls the peel-off of the second electrode layer E2.

As described above, the path through which the gas generated from the moisture absorbed by the resin of the region E2e reaches the gap 17 may serve as a path through which the moisture reaches the region E2e. The region E2a is positioned on the path through which the moisture passes.

In the multilayer capacitor C1, the maximum thickness T1 and the maximum thickness T3 satisfy the relation of $T3/T1 \leq 1.88$.

Therefore, even in a case in which the moisture enters from the gap 17, the moisture tends not to reach the region E2e through the region E2a. The multilayer capacitor C1 reduces an increase in moisture absorbed in the second electrode layer E2 (the region E2e) and an increase in gas generated from the moisture. Consequently, the multilayer capacitor C1 further controls the peel-off of the second electrode layer E2.

In the multilayer capacitor C1, the maximum thickness T3 is larger than the minimum thickness T2. In this case, the gas further tends to move in the region E2a. Therefore, in the multilayer capacitor C1, the gas generated from the moisture absorbed by the resin of the second electrode layer E2 (the region E2e) reaches the gap 17 more reliably, so that the stress further tends not to act on the second electrode layer E2. Consequently, the multilayer capacitor C1 further controls the peel-off of the second electrode layer E2.

In the multilayer capacitor C1, in the cross-section orthogonal to the principal surface 3a and the end surface 3e, the surface of the region E2a curves in the convex shape in the direction away from the principal surface 3a.

In the configuration where the surface of the region E2a curves in the convex shape in the direction away from the principal surface 3a, since the thickness of the region E2a tends not to be small locally, a movement path of the gas in the region E2a tends not to be narrow on the movement path. Therefore, the multilayer capacitor C1 tends not to suppress the movement of the gas in the region E2a. The gas generated from the moisture absorbed by the resin of the second electrode layer E2 reaches the gap 17 more reliably. Consequently, the multilayer capacitor C1 controls the peel-off of the second electrode layer E2 more reliably.

In the multilayer capacitor C1, when viewed from the first direction D1, the end edge $Ee_2$ of the region E2a curves.

In the configuration where the end edge $Ee_2$ of the region E2a curves, the length of the end edge $Ee_2$ of the region E2a is larger than that of a configuration where the end edge $Ee_2$ of the region E2a has a linear shape. Therefore, in the multilayer capacitor C1, a region from which the gas is emitted is large, and the gas further tends to be emitted from the external electrode 5. Consequently, the stress further tends not to act on the second electrode layer E2.

Figure 11:
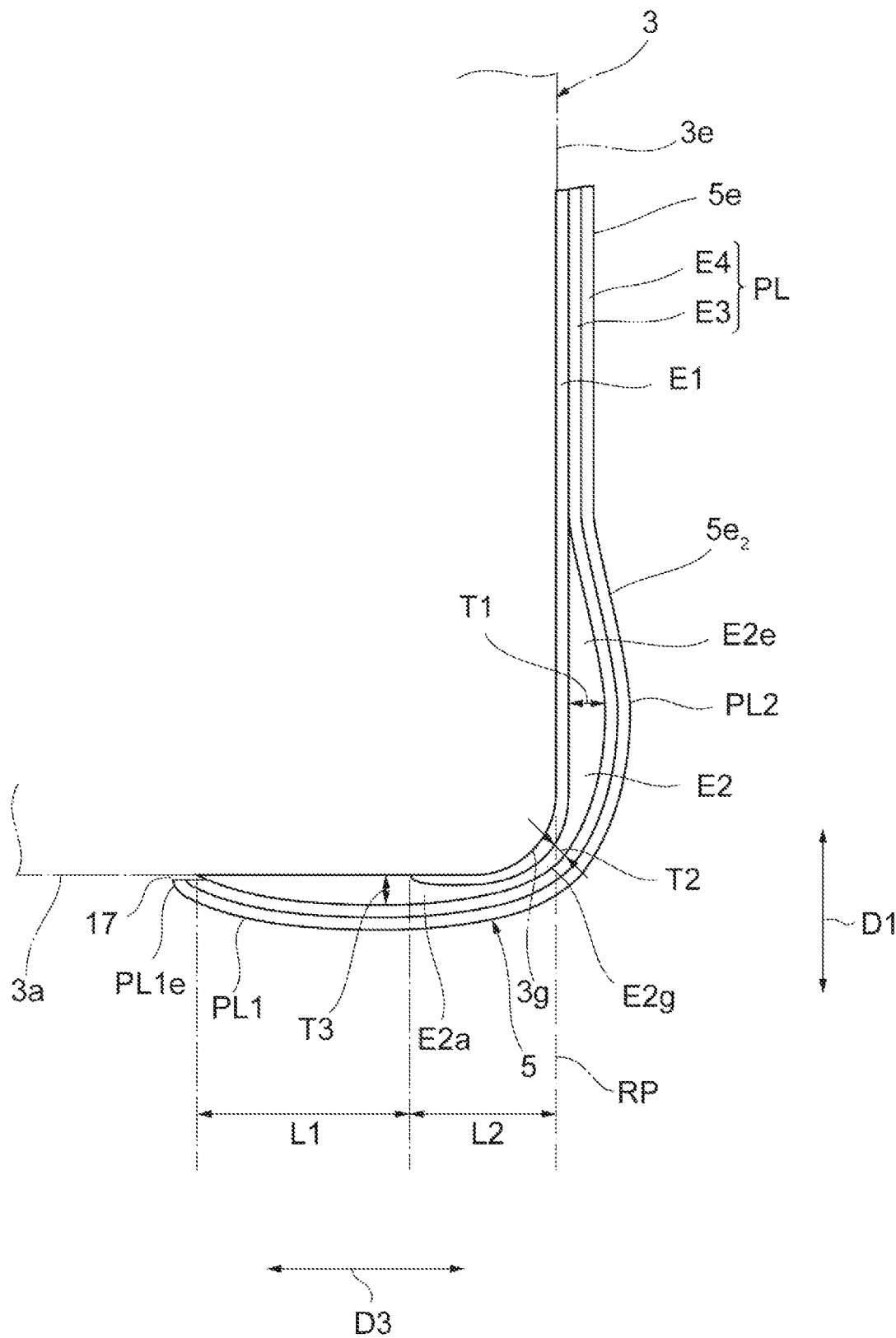
FIG. 11 is a view illustrating a cross-sectional configuration of an external electrode.

A configuration of a multilayer capacitor according to a modification of the present embodiment will be described with reference to FIG. 11. FIG. 11 is a view illustrating a cross-sectional configuration of an external electrode. The multilayer capacitor according to the modification is generally similar to or the same as the multilayer capacitor C1 described above. However, the configuration of the first electrode layer E1 of the modification is different from that in the embodiment described above. Hereinafter, a difference between the embodiment and the modification will be mainly described.

The multilayer capacitor according to the modification includes the element body 3 and the plurality of external electrodes 5, as with the multilayer capacitor C1. Each of the external electrodes 5 includes the plurality of electrode portions 5a, 5c, and 5e. Each of the external electrodes 5 includes the first electrode layer E1, the second electrode layer E2, the third electrode layer E3, and the fourth electrode layer E4. The multilayer capacitor according to the modification also includes the plurality of internal electrodes 7 and the plurality of internal electrodes 9, although not illustrated in the drawing.

As illustrated in FIG. 11, the first electrode layer E1 of the electrode portion 5a is disposed on the principal surface 3a. The first electrode layer E1 of the electrode portion 5a is formed to cover a part of the principal surface 3a and the entirety of the ridge portion 3g. The first electrode layer E1 is disposed over the principal surface 3a and the end surface 3e. The first electrode layer E1 of the electrode portion 5a is in contact with a part of the principal surface 3a. The part of the principal surface 3a is, for example, the partial region close to the end surface 3e, in the principal surface 3a.

The first electrode layer E1 of the electrode portion 5b is disposed on the principal surface 3b. The first electrode layer E1 of the electrode portion 5b is formed to cover a part of the principal surface 3b and the entirety of the ridge portion 3h. The first electrode layer E1 is disposed over the principal surface 3b and the end surface 3e. The first electrode layer E1 of the electrode portion 5b is in contact with a part of the principal surface 3b. The part of the principal surface 3b is, for example, the partial region close to the end surface 3e, in the principal surface 3b.

A length L1 from the end edge of the first electrode layer E1 to the end edge of the region E2a in the third direction D3 is larger than a length L2 from a reference plane RP to the end edge of the first electrode layer E1 in the third direction D3. The reference plane RP is a plane including the end surface 3e.

Each of the lengths L1 and L2 can be determined, for example, as follows.

A cross-sectional photograph of the multilayer capacitor including the first electrode layer E1 and the second electrode layer E2 is obtained. The cross-sectional photograph is obtained, for example, by capturing a cross-section of the multilayer capacitor taken along a plane that is parallel to the pair of side surfaces 3c and is equidistant from the pair of side surfaces 3c. Each of the lengths L1 and L2 on the obtained cross-sectional photograph is calculated.

The first electrode layer E1 of the electrode portion 5c is also disposed on the side surface 3c, though not illustrated in the drawing. In this case, the first electrode layer E1 of the electrode portion 5c is formed to cover a part of the side surface 3c and the entirety of the ridge portion 3i. The first electrode layer E1 is disposed over the side surface 3c and the end surface 3e. The first electrode layer E1 of the electrode portion 5c is in contact with a part of the side surface 3c. The part of the side surface 3c is, for example, the partial region close to the end surface 3e, in the side surface 3c.

The degree of cohesive contact between the element body 3 and the second electrode layer E2 is lower than the degree of cohesive contact between the first electrode layer E1 and the second electrode layer E2. Therefore, an interface between the first electrode layer E1 and the second electrode layer E2 tends not to contribute to the movement path of the gas, and an interface between the element body 3 and the second electrode layer E2 tends to contribute as the movement path of the gas.

The configuration where the length L1 is larger than the length L2 has more movement paths of the gas than a configuration where the length L1 is equal to or smaller than the length L2. In the present modification, the gas generated from the moisture absorbed by the resin of the second electrode layer E2 tends to move toward a gap 17. Therefore, the stress further tends not to act on the second electrode layer E2. Consequently, the present modification further controls the peel-off of the second electrode layer E2.

In the present specification, in a case in which an element is described as being disposed on another element, the element may be directly disposed on the other element or be indirectly disposed on the other element. In a case in which an element is indirectly disposed on another element, an intervening element is present between the element and the other element. In a case in which an element is directly disposed on another element, no intervening element is present between the element and the other element.

In the present specification, in a case in which an element is described as being positioned on another element, the element may be directly positioned on the other element or be indirectly positioned on the other element. In a case in which an element is indirectly positioned on another element, an intervening element is present between the element and the other element. In a case in which an element is directly positioned on another element, no intervening element is present between the element and the other element.

In the present specification, in a case in which an element is described as covering another element, the element may directly cover the other element or indirectly cover the other element. In a case in which an element indirectly covers another element, an intervening element is present between the element and the other element. In a case in which an element directly covers another element, no intervening element is present between the element and the other element.

Although the embodiment and modification of the present invention have been described above, the present invention is not necessarily limited to the embodiments and modifications, and the embodiment can be variously changed without departing from the scope of the invention.

The maximum thickness T1 and the minimum thickness T2 may not satisfy the relation of $T2/T1 \leq 0.91$.

In a case where the maximum thickness T1 and the minimum thickness T2 satisfy the relation of $T2/T1 \leq 0.91$, the multilayer capacitor C1 further controls the peel-off of the second electrode layer E2 as described above.

The maximum thickness T1 and the maximum thickness T3 may not satisfy the relation of $T3/T1 \geq 0.49$.

In a case where the maximum thickness T1 and the maximum thickness T3 satisfy the relation of $T3/T1 \geq 0.49$, the multilayer capacitor C1 further controls the peel-off of the second electrode layer E2 as described above.

The maximum thickness T1 and the maximum thickness T3 may not satisfy the relation of $T3/T1 \geq 1.88$.

In a case where the maximum thickness T1 and the maximum thickness T3 satisfy the relation of $T3/T1 \geq 0.49$, the multilayer capacitor C1 further controls the peel-off of the second electrode layer E2 as described above.

The maximum thickness T3 may be equal to or smaller than the minimum thickness T2. In a case where the maximum thickness T3 is larger than the minimum thickness T2, the multilayer capacitor C1 further controls the peel-off of the second electrode layer E2 as described above.

In a cross-section orthogonal to the principal surface 3a and the end surface 3e, the surface of the region E2a may not curve in a convex shape in a direction away from the principal surface 3a. In a case where, in the cross-section orthogonal to the principal surface 3a and the end surface 3e, the surface of the region E2a curves in a convex shape in a direction away from the principal surface 3a, the multilayer capacitor C1 controls the peel-off of the second electrode layer E2 more reliably as described above.

When viewed from the first direction D1, the end edge $Ee_2$ of the region E2a may not curve. In a case where, when viewed from the first direction D1, the end edge $Ee_2$ of the region E2a curves, the stress further tends not to act on the second electrode layer E2 as described above.

The electronic components of the present embodiment and modification are the multilayer capacitors. Applicable electronic component is not limited to the multilayer capacitor. Examples of the applicable electronic components include, but not limited to, multilayer electronic components such as a multilayer inductor, a multilayer varistor, a multilayer piezoelectric actuator, a multilayer thermistor, or a multilayer composite component, and electronic components other than the multilayer electronic components.

What is claimed is:

1. An electronic component comprising:
an element body including a principal surface arranged to constitute a mounting surface and an end surface adjacent to the principal surface; and
an external electrode disposed on the element body, wherein
the external electrode includes a conductive resin layer disposed to continuously cover a part of the principal surface and a part of the end surface, and a plating layer covering the conductive resin layer,
the conductive resin layer includes a first region that is an entire portion of the conductive resin layer positioned on the part of the end surface, a second region that is an entire portion of the conductive resin layer positioned on a ridge portion between the end surface and the principal surface, and a third region that is an entire portion of the conductive resin layer positioned on the part of the principal surface,
an entire surface of the first region curves in a convex shape in a direction away from the end surface, in a cross-section orthogonal to the principal surface and the end surface, and
a maximum thickness T1 in μm in an entirety of the first region and a minimum thickness T2 in μm in an entirety of the second region satisfy a relation of $T2/T1 \geq 0.26$.

2. The electronic component according to claim 1, wherein the maximum thickness T1 and the minimum thickness T2 satisfy a relation of $T2/T1 \leq 0.91$.

3. The electronic component according to claim 1, wherein
an entire surface of the third region curves in a convex shape in a direction away from the principal surface, in the cross-section orthogonal to the principal surface and the end surface, and
a maximum thickness T3 in μm in an entirety of the third region and the maximum thickness T1 satisfy a relation of $T3/T1 \geq 0.49$.

4. The electronic component according to claim 3, wherein the maximum thickness T1 and the maximum thickness T3 satisfy a relation of $T3/T1 \leq 1.88$.

5. The electronic component according to claim 3, wherein
the maximum thickness T1 and the minimum thickness T2 satisfy a relation of $T2/T1 \leq 0.40$, and the maximum thickness T1 and the maximum thickness T3 satisfy a relation of $T3/T1 \leq 1.51$.

6. The electronic component according to claim 1, wherein a maximum thickness T3 of the third region is larger than the minimum thickness T2.

7. The electronic component according to claim 1, wherein, in the cross-section orthogonal to the principal surface and the end surface, a surface of the third region curves in a convex shape in a direction away from the principal surface.

8. The electronic component according to claim 1, wherein
the external electrode further includes a sintered metal layer, the sintered metal layer being disposed over the principal surface and the end surface and being covered with the conductive resin layer, and
with a plane including the end surface as a reference plane, a length from an end edge of the sintered metal layer to an end edge of the third region in a direction orthogonal to the end surface is larger than a length from the reference plane to the end edge of the sintered metal layer in the direction orthogonal to the end surface.

9. The electronic component according to claim 1, wherein, when viewed from a direction orthogonal to the principal surface, an end edge of the third region curves.

10. An electronic component comprising:
an element body including a principal surface arranged to constitute a mounting surface and an end surface adjacent to the principal surface; and
an external electrode disposed on the element body, wherein
the external electrode includes a conductive resin layer disposed to continuously cover a part of the principal surface and a part of the end surface, and a plating layer covering the conductive resin layer,
the conductive resin layer includes a first region positioned on the end surface, a second region positioned on a ridge portion between the end surface and the principal surface, and a third region positioned on the principal surface,
a maximum thickness T1 of the first region in μm and a minimum thickness T2 of the second region in μm satisfy a relation of $0.26 \leq T2/T1 \leq 0.91$, and a maximum thickness T3 of the third region in μm and the maximum thickness T1 satisfy a relation of $0.49 \leq T3/T1 \leq 1.88$.

11. The electronic component according to claim 10, wherein a maximum thickness T3 of the third region is larger than the minimum thickness T2.

12. The electronic component according to claim 10, wherein, in a cross-section orthogonal to the principal surface and the end surface, a surface of the third region curves in a convex shape in a direction away from the principal surface and a surface of the first region curves in a convex shape in a direction away from the end surface.

13. The electronic component according to claim 10, wherein
the external electrode further includes a sintered metal layer, the sintered metal layer being disposed over the principal surface and the end surface and being covered with the conductive resin layer, and
with a plane including the end surface as a reference plane, a length from an end edge of the sintered metal layer to an end edge of the third region in a direction orthogonal to the end surface is larger than a length from the reference plane to the end edge of the sintered metal layer in the direction orthogonal to the end surface.

14. The electronic component according to claim 10, wherein, when viewed from a direction orthogonal to the principal surface, an end edge of the third region curves.

15. The electronic component according to claim 10, wherein the maximum thickness T1 and the minimum thickness T2 satisfy a relation of $T2/T1 \leq 0.40$.

16. The electronic component according to claim 10, wherein the maximum thickness T1 and the maximum thickness T3 satisfy a relation of $T3/T1 \leq 1.51$.

17. An electronic component comprising:
an element body including a principal surface arranged to constitute a mounting surface and an end surface adjacent to the principal surface; and
an external electrode disposed on the element body, wherein
the external electrode includes a conductive resin layer disposed to continuously cover a part of the principal surface and a part of the end surface, and a plating layer covering the conductive resin layer,
the conductive resin layer includes a first region positioned on the end surface, a second region positioned on a ridge portion between the end surface and the principal surface, and a third region positioned on the principal surface,
a maximum thickness T1 of the first region in μm and a minimum thickness T2 of the second region in μm satisfy a relation of $0.26 \leq T2/T1 \leq 0.40$, and a maximum thickness T3 of the third region in μm and the maximum thickness T1 satisfy a relation of $0.49 \leq T3/T1 \leq 1.51$.

* * * * *